United States Patent
Ali et al.

(10) Patent No.: US 12,356,330 B2
(45) Date of Patent: Jul. 8, 2025

(54) FAST WAKEUP RECOVERY FOR NBIOT SYSTEMS

(71) Applicant: STMicroelectronics International N.V., Geneva (CH)

(72) Inventors: Abdelmohsen Ali, Kanata (CA); Mohammed Ashraf, Cairo (EG); Elsayed Ahmed, Mission Viejo, CA (US)

(73) Assignee: STMICROELECTRONICS INTERNATIONAL N.V., Geneva (CH)

( * ) Notice: Subject to any disclaimer, the term of this patent is extended or adjusted under 35 U.S.C. 154(b) by 276 days.

(21) Appl. No.: 18/085,184

(22) Filed: Dec. 20, 2022

(65) Prior Publication Data
US 2024/0205824 A1 Jun. 20, 2024

(51) Int. Cl.
*H04W 52/02* (2009.01)
*H04L 27/26* (2006.01)

(52) U.S. Cl.
CPC ..... *H04W 52/0229* (2013.01); *H04L 27/2659* (2013.01)

(58) Field of Classification Search
CPC .......... H04W 52/0229; H04W 52/0225; H04L 27/2659; H04L 27/2657; H04L 27/2656; H04L 27/2655; H04L 27/266; H04L 27/2662; H04L 27/2663; H04L 27/2665
See application file for complete search history.

(56) References Cited

U.S. PATENT DOCUMENTS

| | | | |
|---|---|---|---|
| 2010/0046685 A1* | 2/2010 | Liu | H04L 27/2656 375/364 |
| 2016/0262123 A1* | 9/2016 | Abedini | H04J 13/0062 |
| 2018/0376448 A1* | 12/2018 | Wild | H04W 68/005 |
| 2019/0229973 A1* | 7/2019 | Sengupta | H04J 11/0079 |
| 2019/0306812 A1* | 10/2019 | Sengupta | H04L 5/0064 |
| 2020/0059963 A1* | 2/2020 | Damnjanovic | H04W 56/001 |
| 2021/0014785 A1* | 1/2021 | Vaze | H04W 36/008357 |
| 2022/0353946 A1* | 11/2022 | Kanamarlapudi | H04W 72/23 |
| 2023/0116740 A1* | 4/2023 | Niu | H04W 36/32 370/331 |
| 2024/0205824 A1* | 6/2024 | Ali | H04W 52/0216 |

FOREIGN PATENT DOCUMENTS

| | | | |
|---|---|---|---|
| EP | 3884633 B1 | 2/2022 | |
| WO | WO-2018066446 A1 * | 4/2018 | G06F 1/32 |

OTHER PUBLICATIONS

EP 23216249.5 Extended European Search Report mailed Jun. 6, 2024.
Haapala et al., "Temperature Compensation of Crystal References in NB-IoT Modems," IEEE Transaction on Circuits and Systems-I, Regular Papers, vol. 67, No. 7, (Jul. 2020).

* cited by examiner

*Primary Examiner* — Phong La
(74) *Attorney, Agent, or Firm* — ALSTON & BIRD LLP

(57) ABSTRACT

Systems, apparatuses, methods, and computer products for fast wakeup recovery for narrow-band internet of things (NBIOT) systems are provided. The fast wakeup recovery may wakeup a NBIOT device from a sleep mode to an active mode. The fast wakeup recovery may identify a servicing cell for the NBIOT device to synchronize with. The fast wakeup recovery may be based on a coarse timing detection operation using a NPSS and a fine timing detection operation using a NSSS.

18 Claims, 16 Drawing Sheets

FAST WAKEUP RECOVERY FOR NBIOT SYSTEMS

TECHNOLOGICAL FIELD

Example embodiments of the present disclosure relate generally to wakeup recovery for cellular internet of things (IOT) systems, and more particularly to fast wakeup recovery in cellular narrow-band IOT (NBIOT) systems.

BACKGROUND

Cellular IOT systems, including NBIOT systems, are low power technologies where battery life is important in some examples. For example, IOT devices may be used in applications where power to the IOT device is by a battery that is rarely replaced and may be difficult to access. To save battery life, an IOT device may periodically enter a sleep mode that turns off some or most of the IOT device. Thus, to preserve battery life, the IOT device is encouraged to save power when time permits. These IOT devices may remain in a sleep mode and only wake up occasionally to communicate with a cellular network. While in a sleep mode the IOT devices may have low data rates due the IOT devices having a low duty cycle for data transmissions.

In NBIOT systems, the cellular network may schedule a sleep cycle, which may be referred to as a Discontinuous Reception (DRX) cycle. Additionally, an NBIOT device may enter a sleep cycle when the NBIOT device decides that it has nothing to do with the network. In such cycles a NBIOT device may completely shut down the portions of the NBIOT device that consume power. This allows a NBIOT device to enter a deep sleep state to save power. With extended DRX cycles, the NBIOT device may have a battery that lasts for years.

By entering a sleep mode, however, the IOT device loses synchronization with the cellular network. Thus, on wakeup, synchronization to the network needs to be restored. This process of restoring synchronization to the network is referred to as wakeup recovery. For cellular systems using Orthogonal Frequency Division Multiplexing (OFDM) wireless communication, such as in NBIOT systems, both time synchronization and frequency synchronization are needed, in some examples, for proper operation.

In waking up after the sleep period ends, a IOT device has to wake up at the right or assigned time to communicate with the cellular IOT network to receive a paging message. Paging messages may be scheduled in accordance with, for example, 3GPP TS 36.133. For DRX cycles, a paging message may be scheduled over 0.32, 0.64, 1.28, or 2.56 seconds. For extended DRX cycles, a paging message may be scheduled over a range from 5.12 second to 43 minutes. Without being properly synchronized to the cellular network, the IOT device may fail to receive the paging message. A failure in receiving the paging message would result in severe connection interruptions or even a lost connection to the cellular IOT network.

A wakeup recovery for a IOT device may utilize 10,000 times more power during wakeup recovery than during a sleep mode. This is due, in part, to varying channel conditions, having discrete and/or specialized hardware that requires increased power consumption and adds complexity, and the processing times for wakeup processes being long, which rely on the discrete and/or specialized hardware to be powered for these long processing times. For example, some IOT devices utilize expensive temperature-controlled oscillators, but these increase cost and include discrete hardware that increases power consumption and takes up space in the IOT device. Another example uses direct correlation mechanisms in a sequential manner to first detect frequency errors and then timing errors without any knowledge of channel conditions. However, such direct correlation mechanisms have slow response times and, thus, consume larger amounts of power over the slower response time, in some examples.

The inventors have identified numerous areas of improvement in the existing technologies and processes, which are the subjects of embodiments described herein. Through applied effort, ingenuity, and innovation, many of these deficiencies, challenges, and problems have been solved by developing solutions that are included in embodiments of the present disclosure, some examples of which are described in detail herein.

BRIEF SUMMARY

Various embodiments described herein relate to systems, apparatuses, and methods for fast wakeup recovery for cellular IOT systems.

In accordance with some embodiments of the present disclosure, an example method may be provided. The method may comprise: executing a wakeup recovery operation, wherein the wakeup recovery operation comprises: executing, by an NBIOT modem of a NBIOT device, a coarse timing detection operation, wherein the coarse timing detection operation generates a coarse timing offset and a coarse frequency offset based on a sampled signal; and executing, by the NBIOT modem, a fine timing detection operation, wherein a fine timing sample operation generates a cell identifier based on the sampled signal, the coarse timing offset, and the coarse frequency offset. The method may further comprise entering, by the NBIOT device, an active mode wherein the NBIOT modem is synchronized with a cell associated with the cell identifier.

In some embodiments, executing the coarse timing detection operation comprises: generating, via a downsampler, a downsampled signal based on the sampled signal; determining a plurality of frequency offsets; generating a plurality of offset downsampled signals based on the plurality of frequency offsets and the downsampled signal, wherein each of the plurality of offset downsampled signals has a different frequency offset; correlating the offset downsampled signals with a plurality of NPSS matched filters, wherein each of the NPSS matched filters is based on an NPSS sequence and one of the plurality of offset downsampled signals; approximating an absolute value of each of the plurality of correlated offset downsampled signals; averaging each of the plurality of approximated absolute values of each of the correlated offset downsampled signals; dynamically scaling each of the plurality of averaged approximated absolute values of each of the correlated offset downsampled signals; determining a coarse timing maximum of the plurality of dynamically scaled averaged approximated absolute values of each of the correlated offset downsampled signals; and determining the coarse timing offset and the coarse frequency offset based on the coarse timing maximum.

In some embodiments, executing the fine timing detection operation comprises: generating a NSSS sequence in a frequency domain based on the sampled signal, wherein synthesizing the NSSS sequence in the frequency domain comprises: determining a NSSS sequence from the sampled signal; applying a time alignment to the NSSS sequence based on the coarse timing offset; correcting a carrier frequency offset of the NSSS sequence based on the coarse frequency offset; removing a cyclical prefix of the NSSS sequence; and applying a fast-Fourier transform to the NSSS sequence. The method may further comprise determining a plurality of fine timing samples; correlating the NSSS sequence in the frequency domain with a plurality of NSSS matched filters, wherein each of the NSSS matched filters is based on one of the plurality of fine timing samples and a cell ID of a first cell; approximating an absolute value of each of the plurality of correlated NSSS sequences in the frequency domain; averaging each of the plurality of approximated absolute values of each of the correlated NSSS sequences in the frequency domain; dynamically scaling each of the plurality of averaged approximated absolute values of each of the correlated NSSS sequences in the frequency domain; determining a fine timing maximum of the plurality of dynamically scaled averaged approximated absolute values of each of the correlated NSSS sequences in the frequency domain; and determining the cell identifier based on the fine timing maximum.

In some embodiments, determining the coarse timing maximum further comprises nulling one or more side peaks of one or more of the plurality of dynamically scaled averaged approximated absolute values of each of the correlated offset downsampled signals; and determining the fine timing maximum further comprises nulling one or more side peaks of one or more of the plurality of dynamically scaled averaged approximated absolute values of each of the correlated NSSS sequences in the frequency domain.

In some embodiments, determining the coarse timing maximum is based on on-the-fly maximization, and wherein determining the fine timing maximum is based on on-the-fly maximization.

In some embodiments, generating, via a downsampler, a downsampled signal based on the sampled signal is based on downsampling by a ratio of 8.

In some embodiments, the NPSS sequence is decimated and the NSSS sequence is decimated.

In some embodiments, the method further comprises: receiving, at an antenna of the NBIOT device and prior to executing the wakeup recovery operation, a first cellular signal from a first cell; entering, by the NBIOT device, a sleep mode; receiving, at the NBIOT modem, a second cellular signal from one or more cells, wherein the one or more cells include the first cell; and sampling the second cellular signal to generate the sampled signal.

In some embodiments, the method further comprises: determining, after entering the sleep mode and prior to executing the wakeup recovery operation, an active time; estimating a processing time for the wakeup recovery operation; determining a time until the wakeup recovery operation; and wherein executing the wakeup recovery operation is executed after the time until wakeup recovery operation has passed.

In some embodiments, the method further comprises: determining, prior to entering sleep mode, a SINR based on the first cellular signal; and wherein estimating a processing time for the wakeup recovery operation is based on the SINR based on the first cellular signal.

In accordance with some embodiments of the present disclosure, an example NBIOT device is provided. In some embodiments, the example NBIOT device may be comprised of an NBIOT modem. The NBIOT modem may be configured to: execute a wakeup recovery operation, wherein the wakeup recovery operation comprises: execute a coarse timing detection operation, wherein the coarse timing detection operation generates a coarse timing offset and a coarse frequency offset based on a sampled signal; and execute a fine timing detection operation, wherein a fine timing sample operation generates a cell identifier based on the sampled signal, the coarse timing offset, and the coarse frequency offset. In some embodiments, the NBIOT may be further configured to enter an active mode wherein the NBIOT modem is synchronized with a cell associated with the cell identifier.

In some embodiments, to execute the coarse timing detection operation the NBIOT modem is further being configured to: generate, via a downsampler, a downsampled signal based on the sampled signal; determine a plurality of frequency offsets; generate a plurality of offset downsampled signals based on the plurality of frequency offsets and the downsampled signal, wherein each of the plurality of offset downsampled signals has a different frequency offset; correlate the offset downsampled signals with a plurality of NPSS matched filters, wherein each of the NPSS matched filters is based on an NPSS sequence and one of the plurality of offset downsampled signals; approximate an absolute value of each of the plurality of correlated offset downsampled signals; average each of the plurality of approximated absolute values of each of the correlated offset downsampled signals; dynamically scale each of the plurality of averaged approximated absolute values of each of the correlated offset downsampled signals; determine a coarse timing maximum of the plurality of dynamically scaled averaged approximated absolute values of each of the correlated offset downsampled signals; and determine the coarse timing offset and the coarse frequency offset based on the coarse timing maximum.

In some embodiments, to execute the fine timing detection operation the NBIOT modem is further being configured to: generate a NSSS sequence in a frequency domain based on the sampled signal, wherein synthesizing the NSSS sequence in the frequency domain comprises: determine a NSSS sequence from the sampled signal; apply a time alignment to the NSSS sequence based on the coarse timing offset; correct a carrier frequency offset of the NSSS sequence based on the coarse frequency offset; remove a cyclical prefix of the NSSS sequence; apply a fast-Fourier transform to the NSSS sequence; determine a plurality of fine timing samples; correlate the NSSS sequence in the frequency domain with a plurality of NSSS matched filters, wherein each of the NSSS matched filters is based on one of the plurality of fine timing samples and a cell ID of a first cell; approximate an absolute value of each of the plurality of correlated NSSS sequences in the frequency domain; average each of the plurality of approximated absolute values of each of the correlated NSSS sequences in the frequency domain; dynamically scale each of the plurality of averaged approximated absolute values of each of the correlated NSSS sequences in the frequency domain; determine a fine timing maximum of the plurality of dynamically scaled averaged approximated absolute values of each of the correlated NSSS sequences in the frequency domain; and determine the cell identifier based on the fine timing maximum.

In some embodiments, to determine the coarse timing maximum further comprises nulling one or more side peaks of one or more of the plurality of dynamically scaled averaged approximated absolute values of each of the correlated offset downsampled signals; and wherein to determine the fine timing maximum further comprises nulling one or more side peaks of one or more of the plurality of dynamically scaled averaged approximated absolute values of each of the correlated NSSS sequences in the frequency domain.

In some embodiments, to determine the coarse timing maximum is based on on-the-fly maximization, and wherein to determine the fine timing maximum is based on on-the-fly maximization.

In some embodiments, to generate, via the downsampler, a downsampled signal based on the sampled signal is based on downsampling by a ratio of 8.

In some embodiments, the NPSS sequence is decimated and the NSSS sequence is decimated.

In some embodiments, the NBIOT device further comprises an antenna; and the NBIOT modem is further configured to: receive, from the antenna and prior to executing the wakeup recovery operation, a first cellular signal from a first cell received by the antenna; enter a sleep mode; receive a second cellular signal from one or more cells, wherein the one or more cells include the first cell; and sample the second cellular signal to generate the sampled signal.

In some embodiments, the NBIOT modem is further configured to: determine, after entering sleep mode and prior to executing the wakeup recovery operation, an active time; estimate a processing time for the wakeup recovery operation; determine a time until the wakeup recovery operation; and to execute the wakeup recovery operation is executed after the time until wakeup recovery operation has passed.

In some embodiments, the NBIOT modem is further configured to: determine, prior to entering sleep mode, a SINR based on the first cellular signal; and wherein to estimate the processing time for the wakeup recovery operation is based on the SINR based on the first cellular signal.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will also be appreciated that the scope of the disclosure encompasses many potential embodiments in addition to those here summarized, some of which will be further described below.

BRIEF SUMMARY OF THE DRAWINGS

Figure 1:
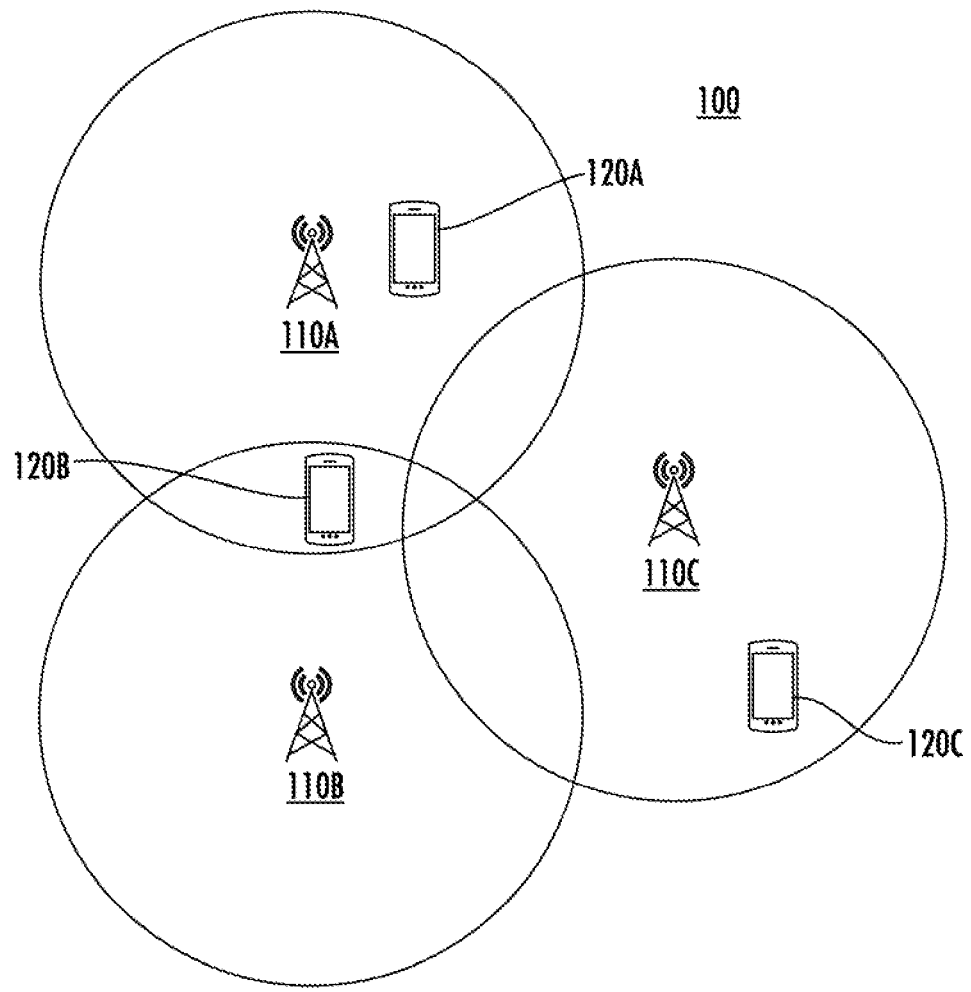
Figure 2:
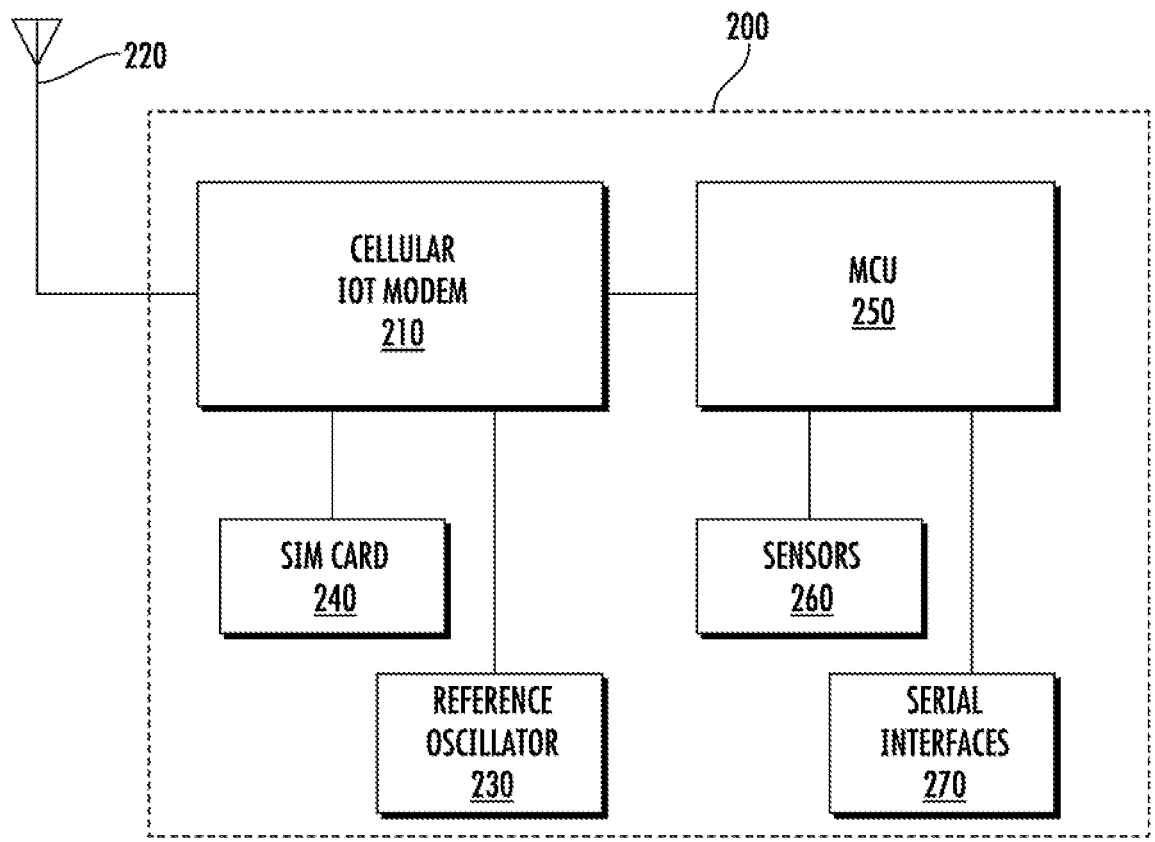
Figure 3:
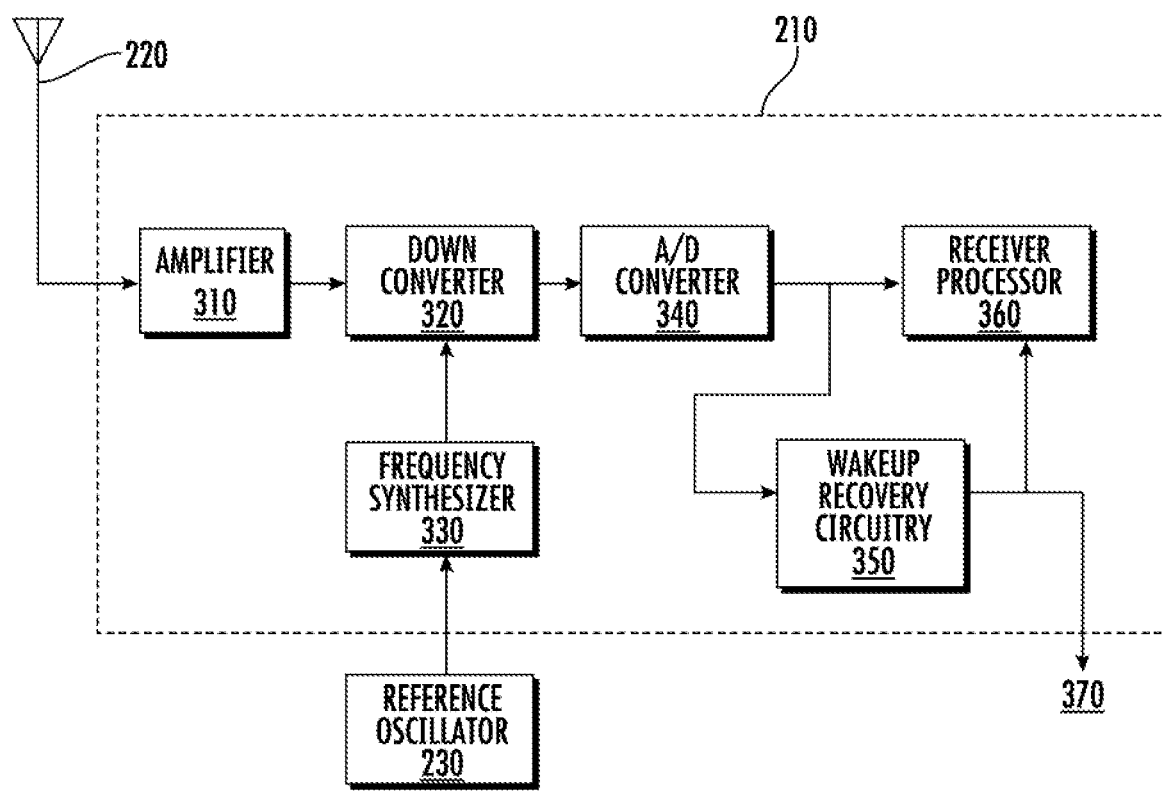
Figure 4:
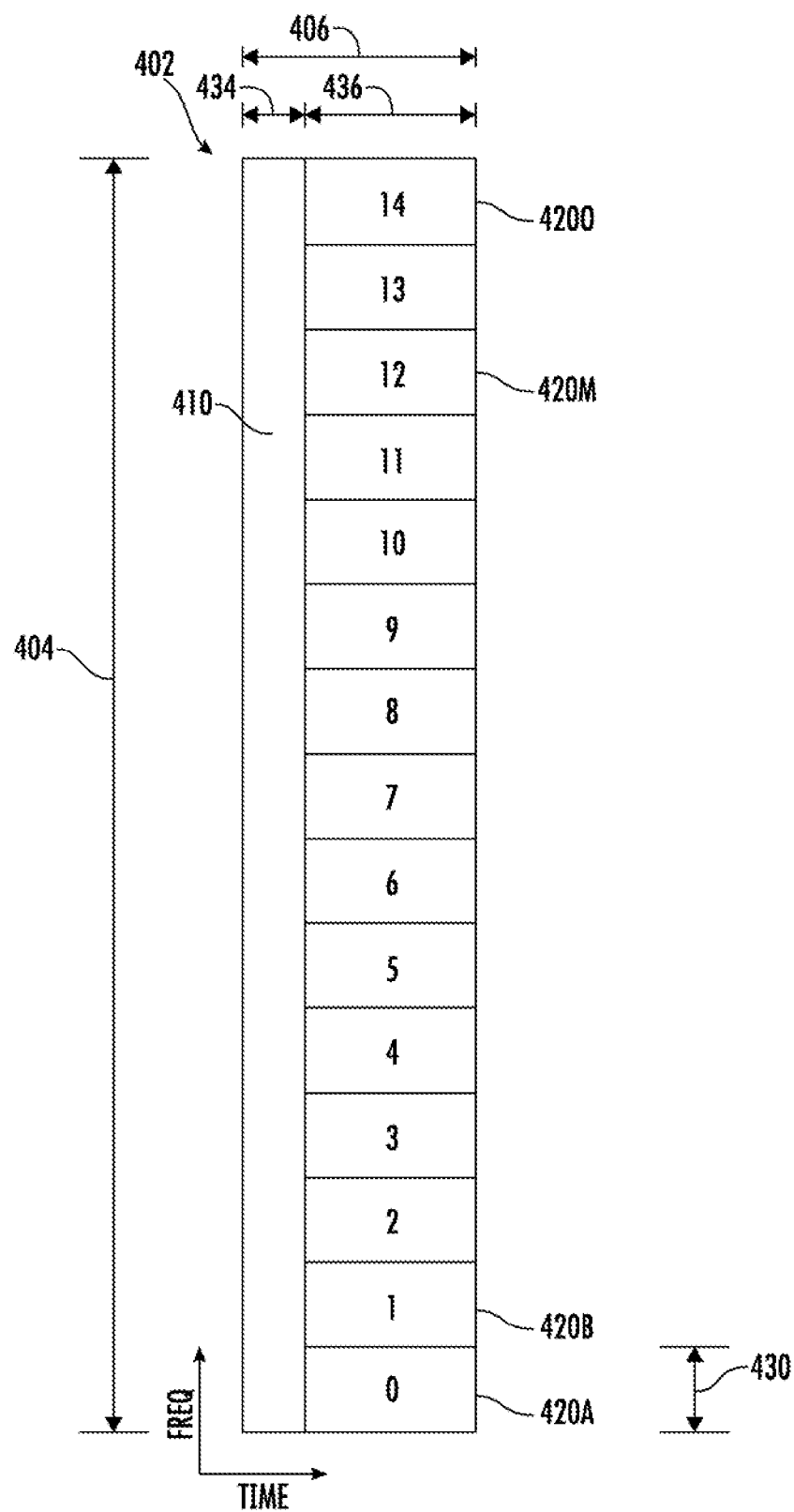
Figure 5:
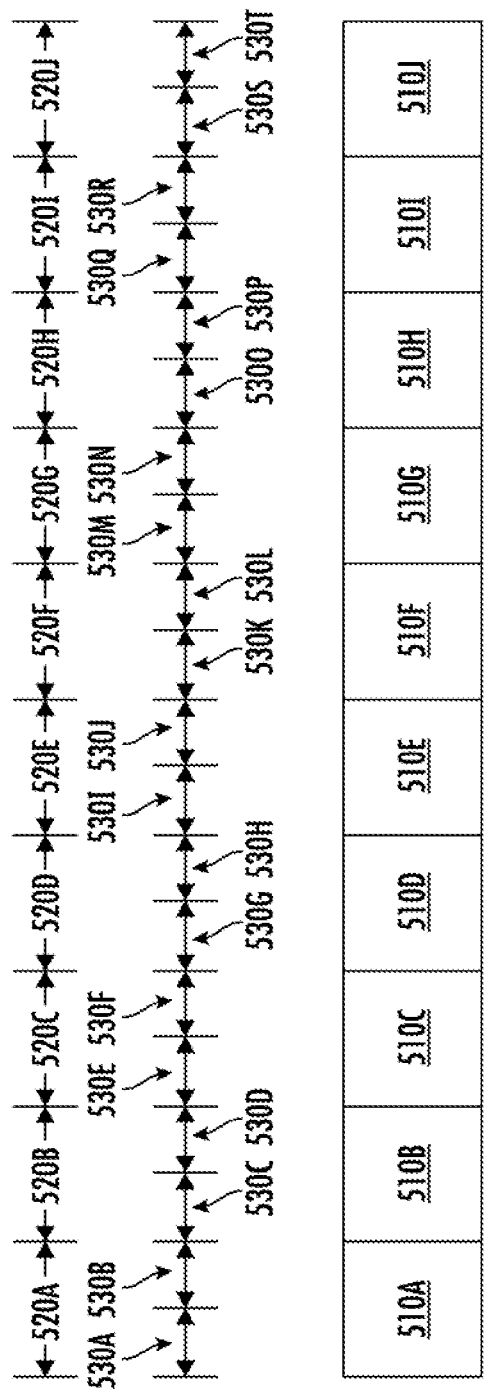
Figure 6A:
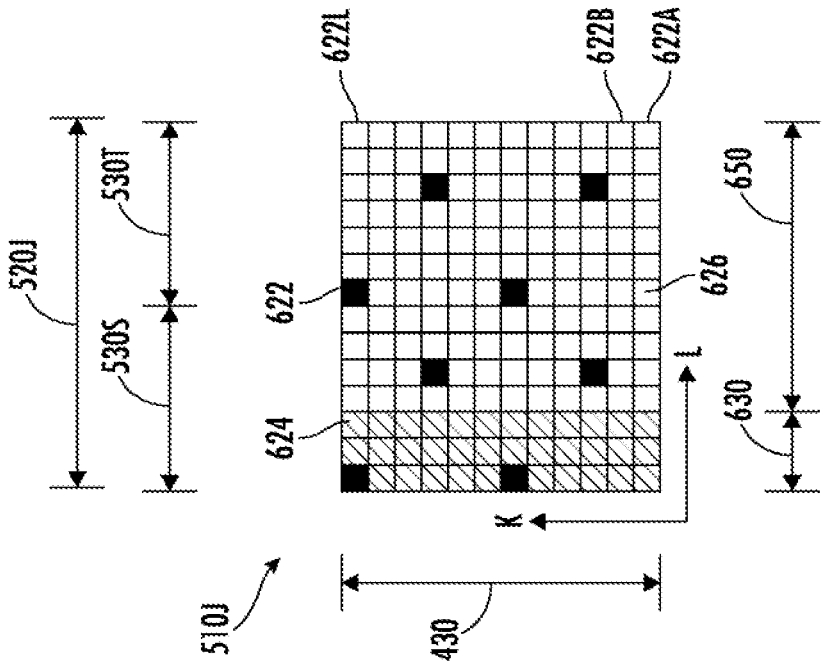
Figure 6B:
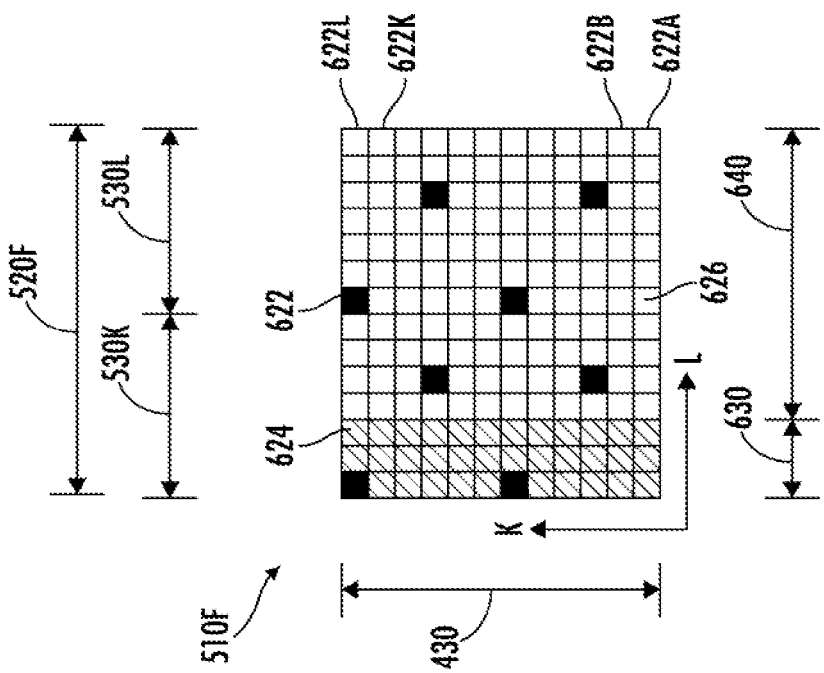
Figure 7:
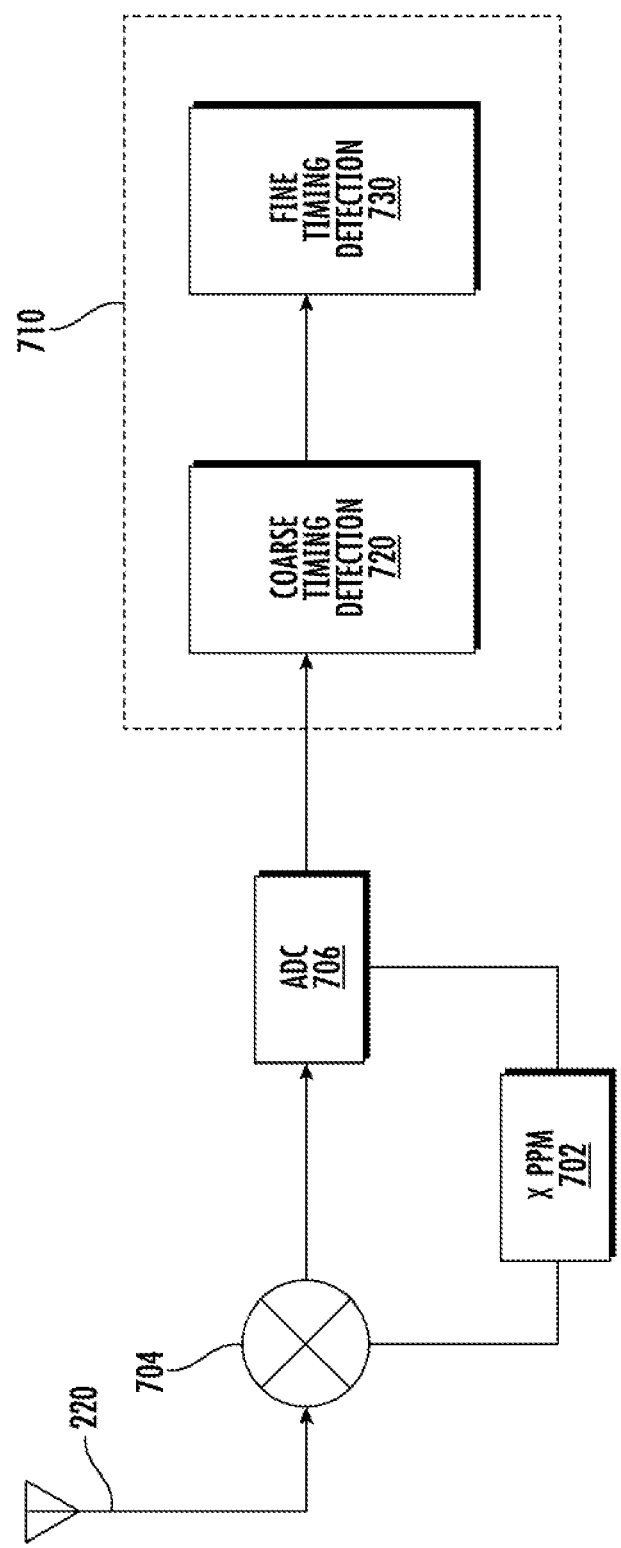
Figure 8:
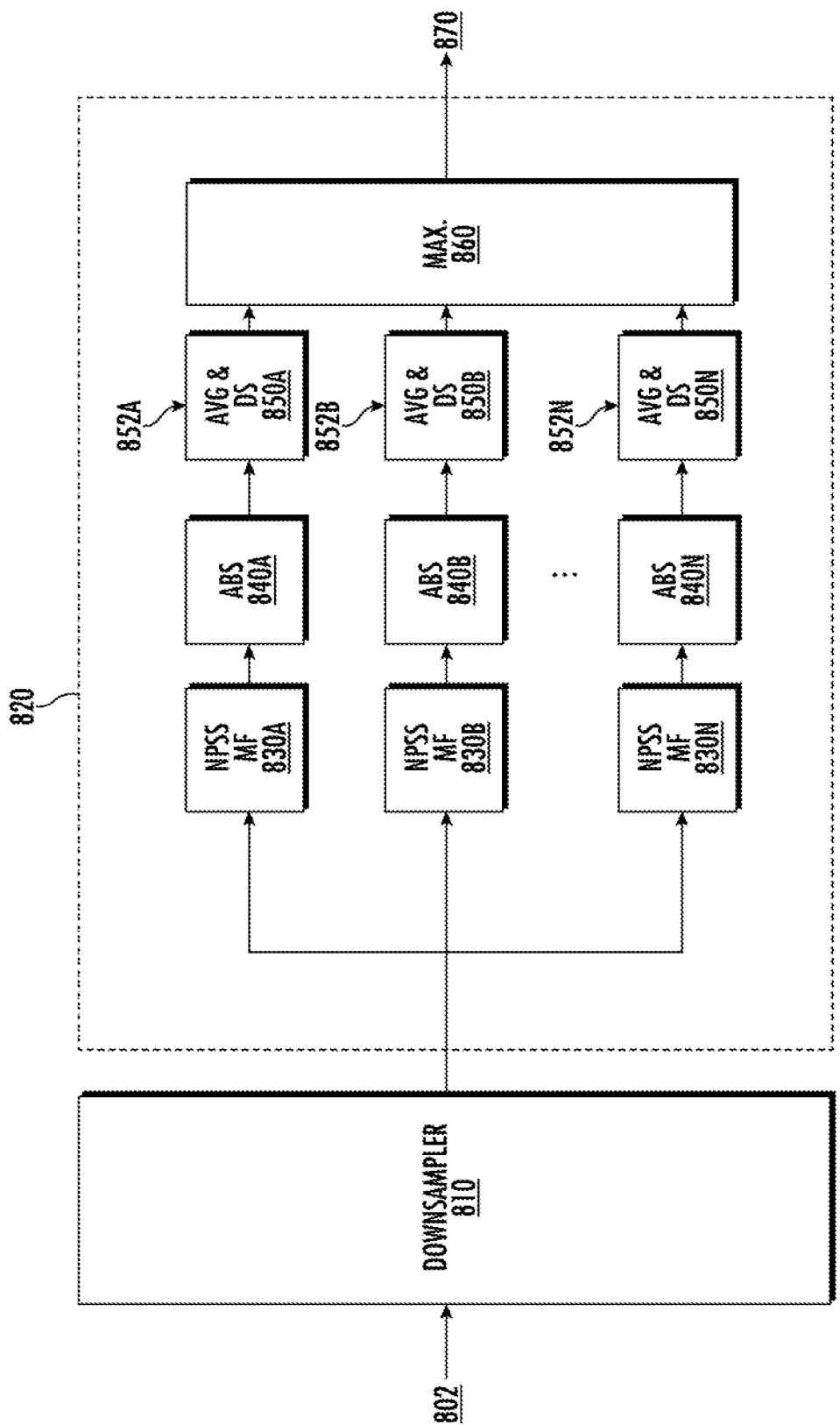
Figure 9:
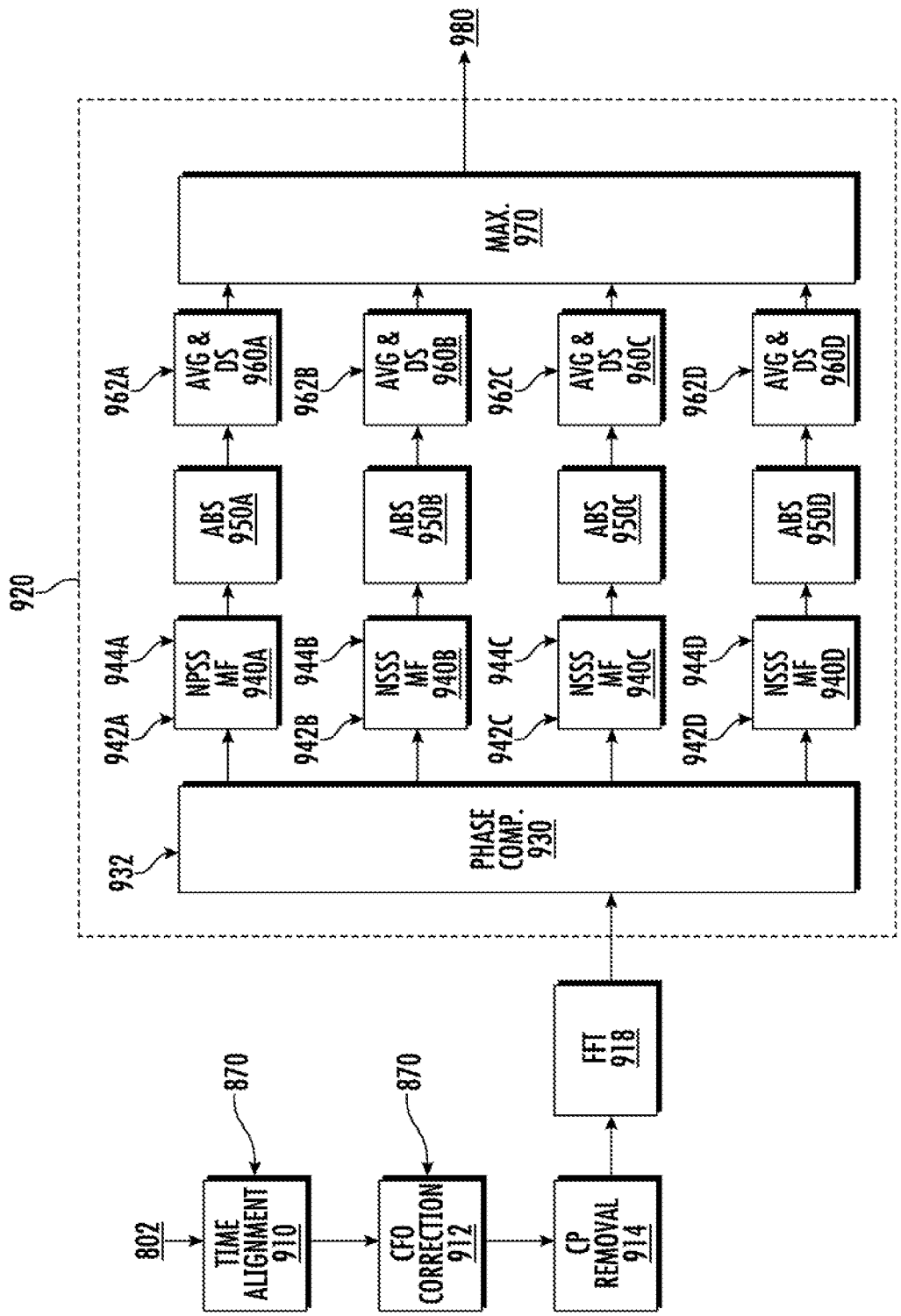
Figure 10:
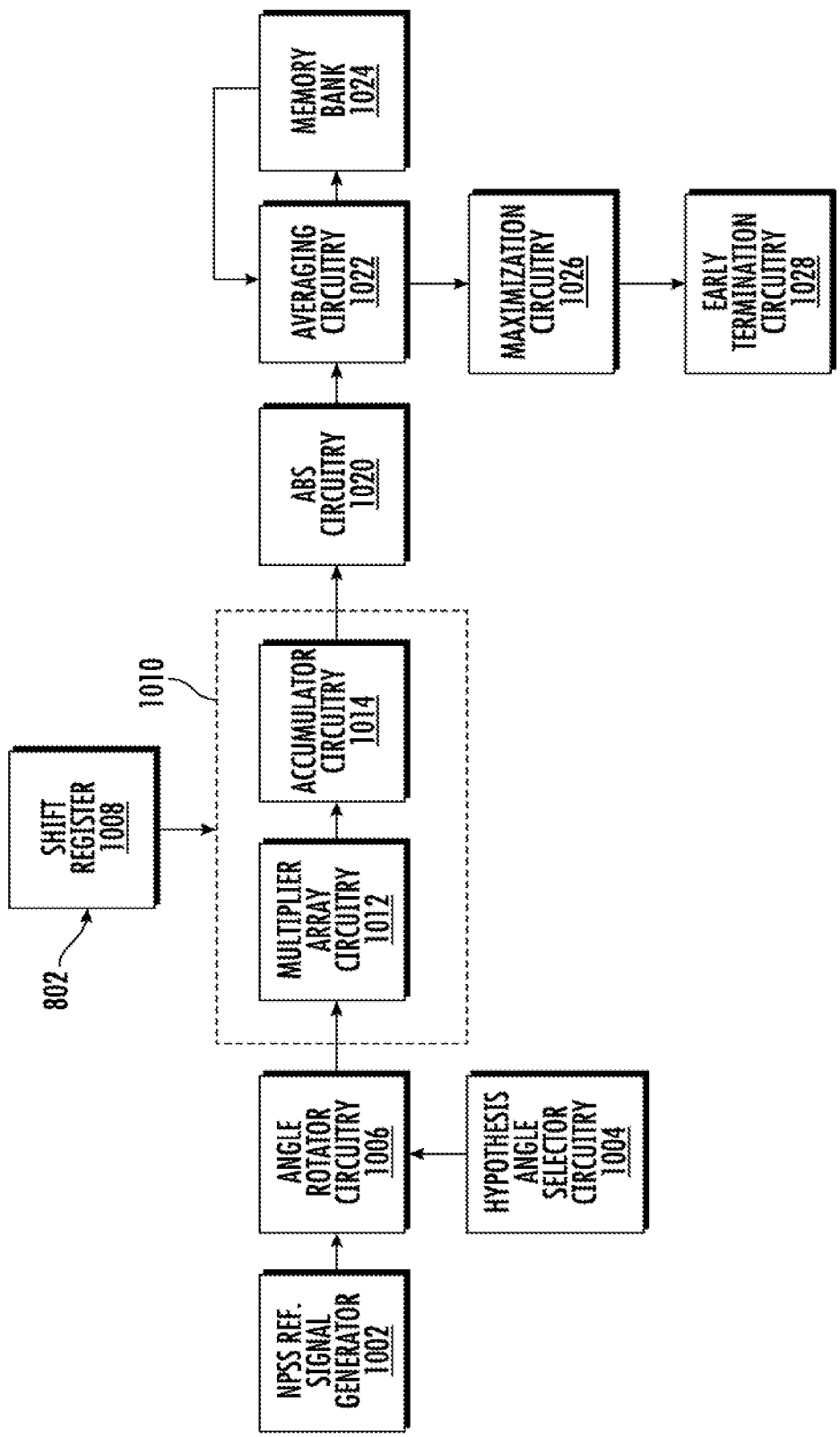
Figure 11:
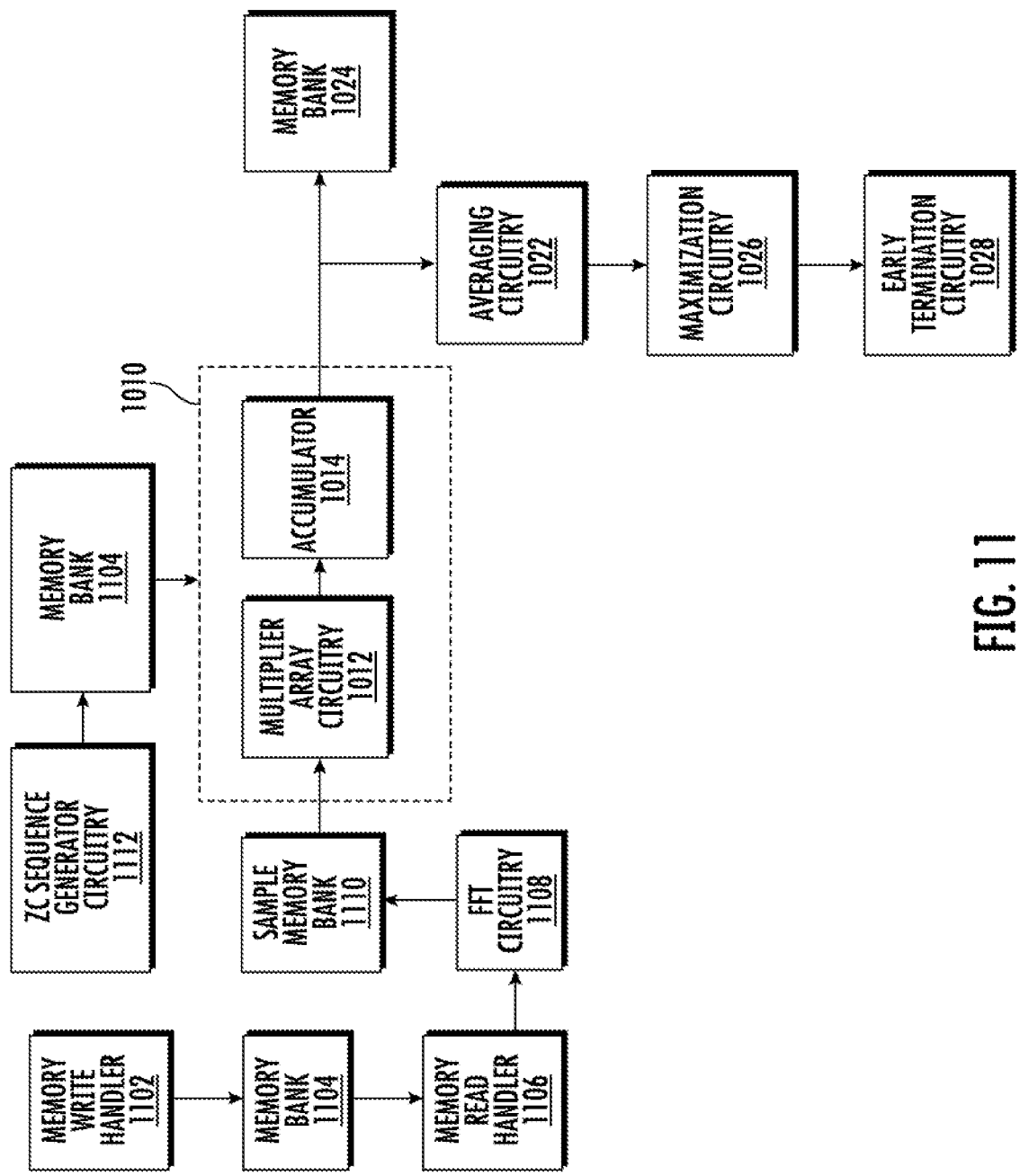
Figure 12:
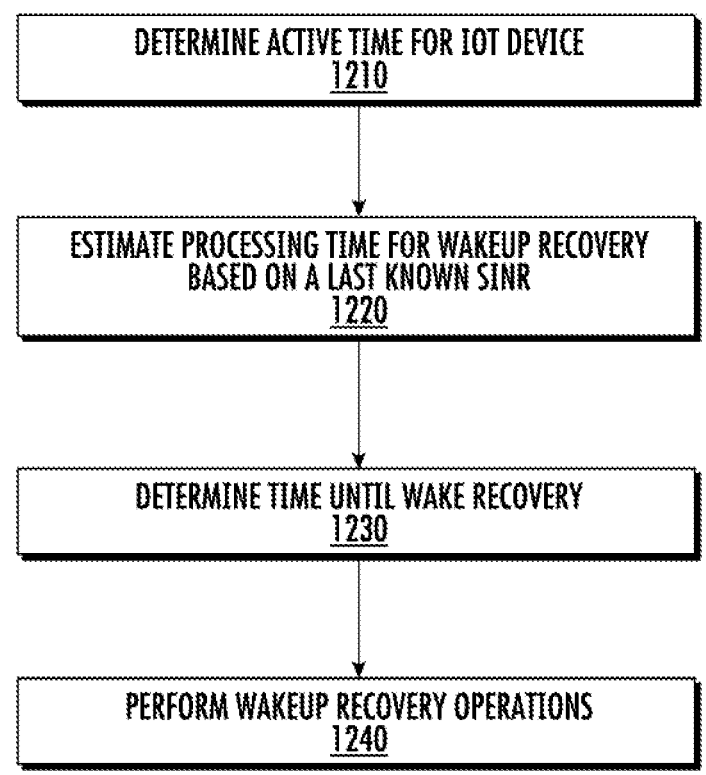
Figure 13:
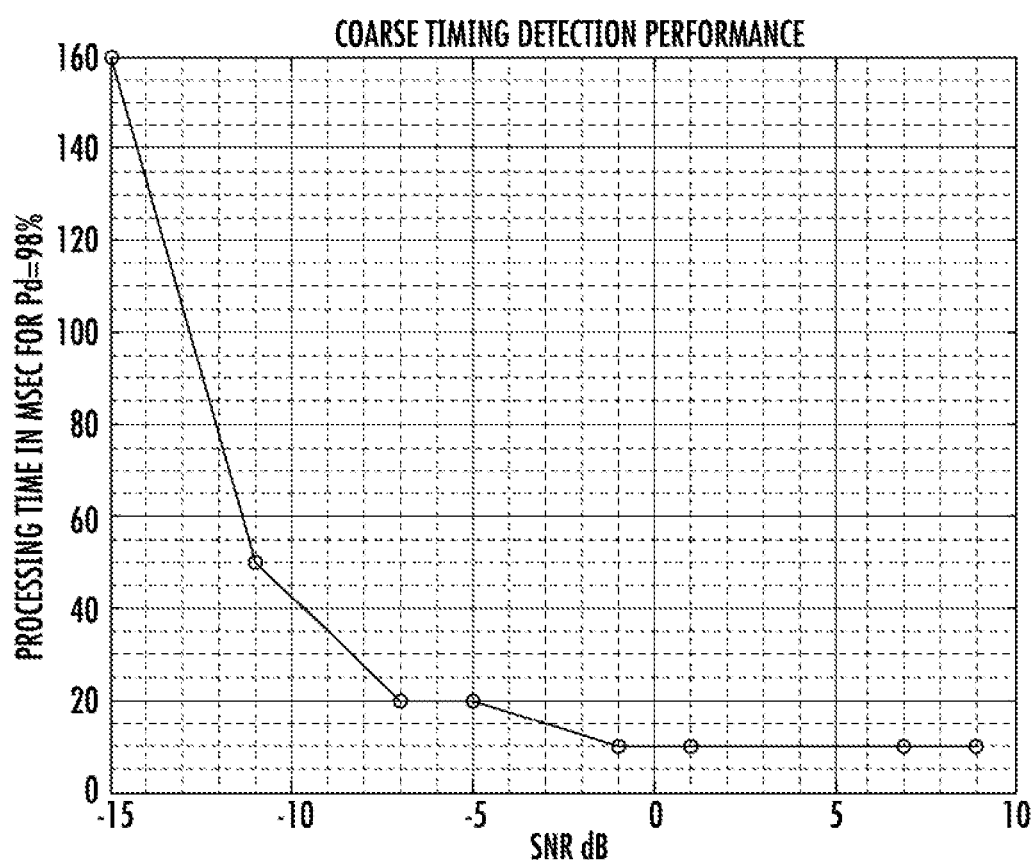
Figure 14:
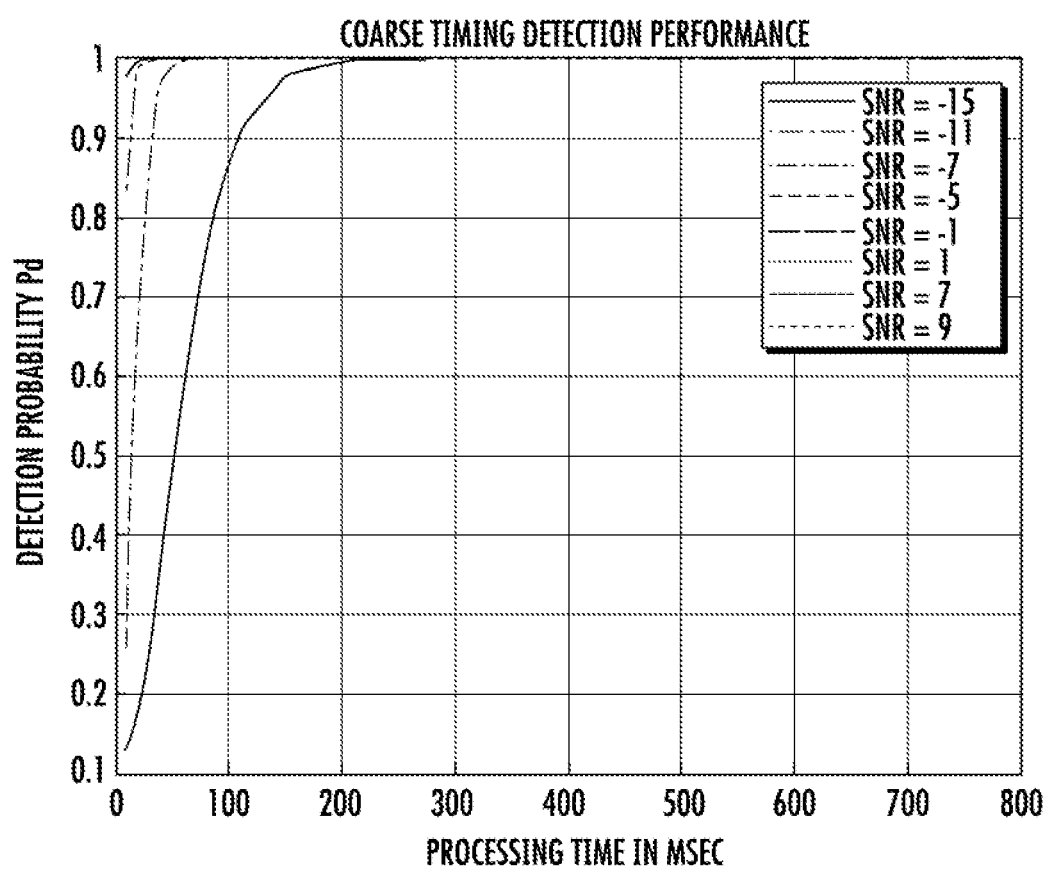
Figure 15:
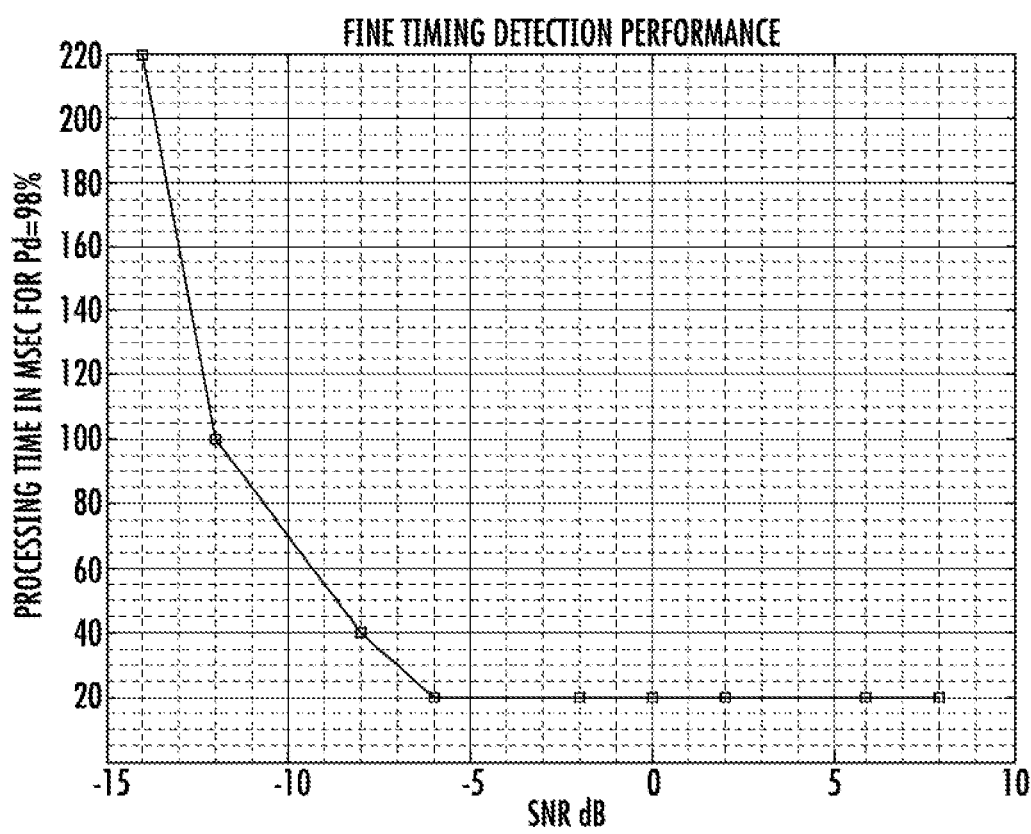
Figure 16:
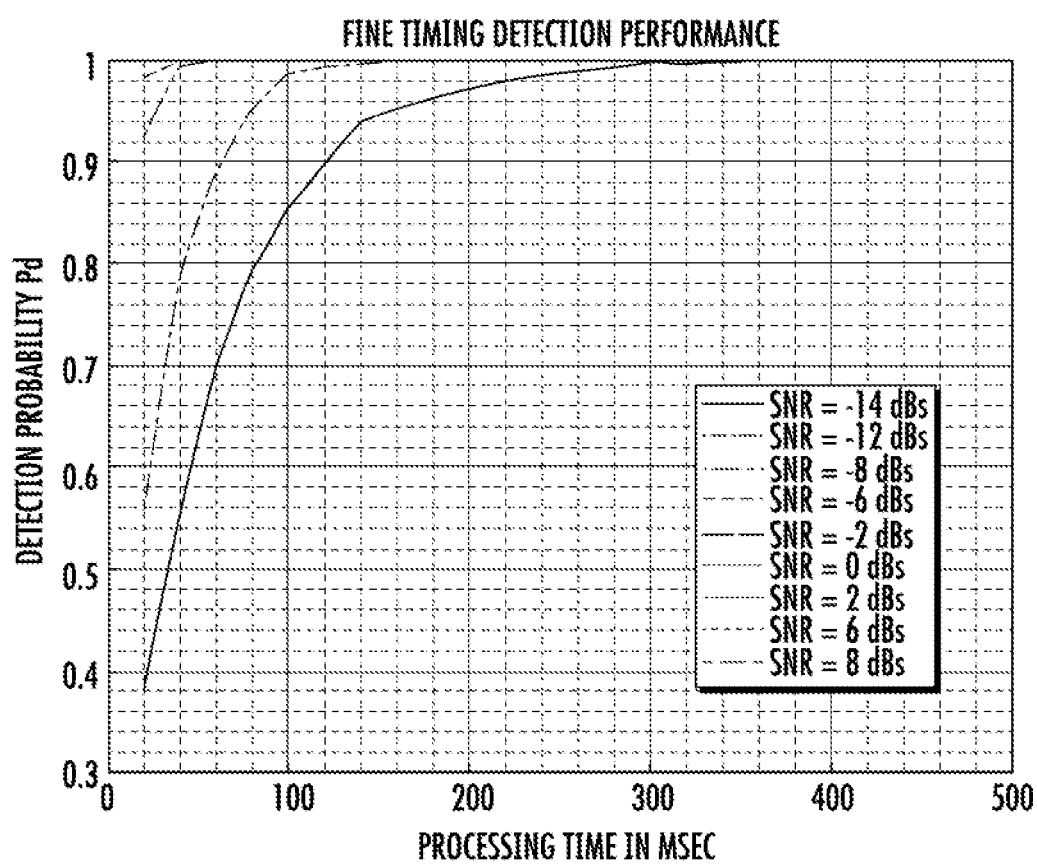

Having thus described certain example embodiments of the present disclosure in general terms, reference will now be made to the accompanying drawings, which are not necessarily drawn to scale, and wherein:

FIG. 1 illustrates an exemplary environment employing a user equipment in accordance with one or more embodiments of the present disclosure;

FIG. 2 illustrates an example block diagram of an IOT device in accordance with one or more embodiments of the present disclosure;

FIG. 3 illustrates an example block diagram of an IOT modem in accordance with one or more embodiments of the present disclosure;

FIG. 4 illustrates an example radio frame structure in accordance with one or more embodiments of the present disclosure;

FIG. 5 illustrates an exemplary frame structure in accordance with one or more embodiments of the present disclosure;

FIG. 6A illustrates an example of a single subframe of an exemplary frame structure in accordance with one or more embodiments of the present disclosure;

FIG. 6B illustrates another example of a single subframe of an exemplary frame structure in accordance with one or more embodiments of the present disclosure;

FIG. 7 illustrates an example block diagram of a flow chart of operations for fast wakeup recovery in accordance with one or more embodiments of the present disclosure;

FIG. 8 illustrates an example block diagram of a flow chart of operations for coarse timing detection operation in accordance with one or more embodiments of the present disclosure;

FIG. 9 illustrates an example block diagram of a flow chart of operations for fine timing detection operation in accordance with one or more embodiments of the present disclosure;

FIG. 10 illustrates an example hardware architecture for coarse timing detection in accordance with one or more embodiments of the present disclosure;

FIG. 11 illustrates an example hardware architecture for fine timing detection in accordance with one or more embodiments of the present disclosure;

FIG. 12 illustrates an example block diagram of a flow chart of operations for determining when to perform wakeup recovery operations in accordance with one or more embodiments of the present disclosure;

FIG. 13 illustrates an exemplary graph of coarse timing detection performance in accordance with one or more embodiments of the present disclosure;

FIG. 14 illustrates an exemplary graph of coarse timing detection performance in accordance with one or more embodiments of the present disclosure;

FIG. 15 illustrates an exemplary graph of fine timing detection performance in accordance with one or more embodiments of the present disclosure; and FIG. 16 illustrates an exemplary graph of fine timing detection performance in accordance with one or more embodiments of the present disclosure.

DETAILED DESCRIPTION

Some embodiments of the present disclosure will now be described more fully herein with reference to the accompanying drawings, in which some, but not all, embodiments of the disclosure are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," "in some embodiments," and the like generally mean that the particular feature, structure, or characteristic following the phrase may be included in at least one embodiment of the present disclosure and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly,"

"typically," "optionally," "for example," "often," or "might" (or other such language) be included or have a characteristic, that a specific component or feature is not required to be included or to have the characteristic. Such a component or feature may be optionally included in some embodiments or it may be excluded.

The use of the term "circuitry" as used herein with respect to components of a system or an apparatus should be understood to include particular hardware configured to perform the functions associated with the particular circuitry as described herein. The term "circuitry" should be understood broadly to include hardware and, in some embodiments, software for configuring the hardware. For example, in some embodiments, "circuitry" may include processing circuitry, communication circuitry, input/output circuitry, and the like. In some embodiments, other elements may provide or supplement the functionality of particular circuitry.

Overview

Various embodiments of the present disclosure are directed to improved systems, apparatuses, methods, and computer programming products for fast wakeup recover for cellular internet of things (IOT) systems. Such cellular IOT systems include but are not limited to cellular narrow-band IOT (NBIOT) systems. Various embodiments described herein address improvements over the conventional cellular IOT devices (a.k.a. IOT devices) complying with the 3GPP NBIOT specifications.

Various embodiments of IOT devices may include, but are not limited to, mobile devices, cellular meters (e.g., gas and power meters), smart city devices and management systems (e.g., street lighting), asset tracking systems, and the like. IOT devices may include an IOT modem as described herein. In various embodiments, reference to a user equipment (UE) may also refer to a IOT device and/or a NBIOT device.

IOT devices may utilize a sleep mode to save power. Before the sleep state an IOT device may be connected to the cellular network. In these examples, the IOT device is fully synchronized to the network prior to entering a sleep mode. Being fully synchronized has the IOT device with it timing and frequency locked. In such examples, the IOT device also has full information about a cell of a cellular network, including a cell ID, cell timing information, and cell quality information. Cell quality information, for example, may include signal-to-interferer plus noise ratio (SINR). In NBIOT systems, the SINR noise may be as low as −15 dBs.

The IOT devices described herein may utilize a wakeup recovery procedure to recover timing synchronization and frequency synchronization for the network after the wakeup recovery so that message exchange with the cellular network may be resumed properly. Such synchronizations may correct for timing drifts that occur during a sleep mode. These timing drifts may cause the IOT device to lose both of the timing synchronization and the frequency synchronization. The wakeup recovery process described herein, in some examples, provides for improved processing time to reduce the time required for the wakeup recovery process. This improved processing time preferably results in a shorter wakeup recovery process.

In some examples, this improvement is due to, among other things, the wakeup recovery process of the present disclosure being adaptive to different channel conditions and environments. For example, as an IOT device has knowledge of the SINR with a cell it was in full synchronization with before going to sleep, the wakeup recovery process may be adapted to and optimized for the channel conditions. Additionally, the wakeup recovery process may be triggered to wakeup the IOT device prior to a required active time with a sufficient processing time for the wakeup recovery process. The trigger may be such that the wakeup recovery process accuracy is met without waking up too early or too late. The trigger, in some examples, may also be a function of the last known SINR.

The wakeup recovery process described herein may include a rapid detection of timing error and frequency error in a received signal in some examples. Such detection allows for the synchronization of an IOT device with the cellular network. The wakeup recovery process includes a plurality of operations which are described collectively herein as wakeup recovery operations. These wakeup recovery operations are, as described herein, efficiently implemented and optimized, in some examples, for low power consumption, recovery speed, and cost while maximizing detection accuracy. Embodiments of the present disclosure provide for improved fast wakeup recovery operation to provide improved processing times, which reduce power consumption, in some examples. For example, some embodiments may achieve wakeup recovery operations that are 15 times faster.

It should be readily appreciated that the embodiments of the apparatus, systems, methods, and computer program products described herein may be configured in various additional and alternative manners in addition to those expressly described herein.

Exemplary Systems, Apparatuses, Methods, and Computer Program Products

Embodiments of the present disclosure herein include systems, apparatuses, methods, and computer program products configured to perform one or more operations for fast wakeup recovery operation for IOT systems and IOT devices. Various embodiments described herein may described using NBIOT systems and NBIOT devices, however it will be appreciated that the embodiments described herein may be implemented in other IOT systems and IOT devices. For example, embodiments described herein may be implemented in other cellular IOT systems, cellular IOT devices, and/or modems.

FIG. 1 illustrates an exemplary environment 100 of a plurality of cells 110 and a plurality of UEs 120 in accordance with one or more embodiments of the present disclosure. The plurality of cells 110 may each provide cellular services to one or more UEs 120 in the cell 110. Each cell 110 may have a unique cell identifier. The cell identifier may be provided in one or more signals transmitted between a cell 110 and a UE 120. For example, cell 110A may provide cellular services to UE 120A and UE 120B, and the cell 110A may be identified by a unique cell identifier so that the UE 120A and UE 120B know to use cell 110A and not another cell 110 (e.g., 110B). Cell 110B may provide cellular services to UE 120B. Cell 110C may provide cellular services to UE 120C. In various embodiments, the cellular service may be a LTE cellular service. The cellular service provided by a cell 110 to a UE 120 may be impaired by environmental factors, such as high noise and/or interference.

In various embodiments, each of the UEs 120 may be in range of a plurality of cells 110. For example, UE 120B may be in range of cell 110A and cell 110B. In various embodiments, a UE 120 (e.g., 120B) may select a cell 110 (e.g., 110A, 110B) to connect to. This selection may be based on, among other things, the quality of the signal received from the cell 110. Alternatively, or additional, for a UE 120 executing a wakeup recovery process, the UE 120 may select a prior cell 110 that the UE 120 was connected and/or synchronized with. In various embodiments, the cells 110 may provide an LTE service configured for and providing NBIOT services according to 3GPP standards.

In various embodiments, a UE 120 may be an cellular IOT apparatus or IOT device. Thus a UE 120 may operate to save power by entering a power saving mode that may be referred to as a sleep mode. In sleep mode, the UE 120 may turn off and/or disable one or more of the UE 120's supplies and/or functions to save power. While sleep mode provides for power savings, sleep mode may also cause the UE 120 to lose synchronization with the network. Synchronization to the network, specifically with a cell 110 previously connected to and/or synchronized with, may be restored by wakeup recovery operations.

In various embodiments, the present disclosure provides for a low-complexity fast wakeup recovery process that, among other things, lowers the power consumption used over conventional systems. The power savings allows for a longer battery life in various example embodiments where a UE 120 utilizes a battery as a power source. As described herein, in various example embodiments this improvement may be implemented by reducing processing times for a given SNR range of a channel between a cell 110 and a UE 120. In various example embodiments, such channels may experience SNR as low as −15 dBs. Additionally, or alternatively, the wakeup recovery operation described herein may adapt to different channel conditions and environments.

FIG. 2 illustrates an example block diagram of an IOT device 200 in accordance with one or more embodiments of the present disclosure. The IOT device 200 may be an example of a UE 120. The IOT device 200 may be comprised of a cellular IOT modem 210, an antenna 220, a reference oscillator 230, a sim card 240, a microcontroller unit (MCU) 250, one or more sensors 260, one or more serial interfaces 270, and additional components and/or circuitry not illustrated (e.g., memory, input/output circuitry, a display). While the antenna 220 is illustrated as being external to the IOT device 200, it will be appreciated that an antenna may be inside of an IOT device 200. For example, an antenna 220 may be internal to an IOT device 200 installed in an environment where an antenna 220 being external to the IOT device 200 may subject the antenna 220 to a harmful environment (e.g., in metering applications).

The cellular IOT modem 210 may be where one or more operations associated with the fast wakeup recovery operation described herein may be performed for wakeup recovery. In various embodiments, the cellular IOT modem 210 may be a NBIOT modem for a NBIOT device. An exemplary cellular IOT modem 210 is illustrated in FIG. 3 and described further herein.

An antenna 220 may be used to transmit and receive signals to one or more cells 110. The signals transmitted by the antenna 220 may be generated by the cellular IOT modem 210 and other components of the IOT device 200 in accordance with an application. The signals received by the antenna 220 may be processed by the cellular IOT modem 210 before being provided, for example, to an application.

A reference oscillator 230 may generate time and frequency reference clock signals. These time and frequency reference clock signals may be used by the cellular IOT modem 210.

In various embodiments, an IOT device 200 may include a sim card 240 that provides unique identification information for use on the cellular network to the IOT device 200. Alternatively, various embodiments may not have a sim card 240 as unique identification information for use on the cellular network may be stored on and provided by other components of the IOT device 200.

A microcontroller unit (MCU) 250 may support the performing of one or more operations described herein, including operations associated with an application. For example, the MCU 250 may perform one or more cellular stack operations, such as cellular stack operations in 3GPP TS 36.320. In various embodiments, a MCU 250 may be comprised of a processor, memory, and input/output circuitry. The input/output circuitry may include connections to sensors 260 and/or serial interfaces 270. The MCU 250 may be configured to executed one or more operations described herein in conjunction with the cellular IOT modem 210.

A processor as described herein may be comprised of a plurality of components and/or processor circuitry. The processor may be implemented as, for example, various components comprising one or a plurality of microprocessors with accompanying digital signal processors; one or a plurality of processors without accompanying digital signal processors; one or a plurality of coprocessors; one or a plurality of multi-core processors; processing circuits; and various other processing elements. The processor may include integrated circuits, such as ASICs, FPGAs, systems-on-a-chip (SoC), or the like. In various embodiments, the processor may be configured to execute applications, instructions, and/or programs stored in the processor, memory, or otherwise accessible to the processor. When executed by the processor, these applications, instructions, and/or programs may enable the execution of one or a plurality of the operations and/or functions described herein. Regardless of whether it is configured by hardware, firmware/software methods, or a combination thereof, the processor may comprise entities capable of executing operations and/or functions according to the embodiments of the present disclosure when correspondingly configured.

The memory, as described herein, may comprise, for example, a volatile memory, a non-volatile memory, or a certain combination thereof. Although referred to as a single memory, the memory may comprise a plurality of memory components. In various embodiments, the memory may comprise, for example, a random access memory, a cache memory, a flash memory, a circuit configured to store information, or a combination thereof. The memory may be configured to write or store data, information, application programs, instructions, etc. so that a processor may execute various operations and/or functions according to the embodiments of the present disclosure. In some embodiments, the memory may be configured to store program instructions for execution by the processor. When operations and/or functions are executed, the stored information may be stored and/or used by the processor.

An IOT device 200 may include one or more sensors 260. The sensor(s) 260 may vary with an application the IOT device 200 is associated with. For example, various embodiments of IOT devices 200 for street lighting applications may include light sensors to assist with controlling the operation of a street light. Various embodiments may include temperature sensors to assist with one or more operations. For example, a temperature sensor may assist with controlling an oscillator.

Serial interfaces 270 may be a portion of input/output circuitry of an IOT device 200 for various embodiments of the present disclosure. Input/output circuitry may communicate with a processor to receive instructions input by a user and/or to provide audible, visual, mechanical, or other outputs to a user. The input/output circuitry may comprise supporting devices, such as a keyboard, a mouse, a user interface, a display, a touch screen display, lights (e.g., warning lights), indicators, speakers, and/or other input/output mechanisms. The input/output circuitry may comprise one or more interfaces, such as serial interfaces 270, to which supporting devices may be connected. For example, supporting devices may be connected to provide or receive application data for an application being executed by the MCU 250. In some embodiments, interfaces may in SPI and UART interfaces.

FIG. 3 illustrates an example block diagram of a cellular IOT modem 210 in accordance with one or more embodiments of the present disclosure. In various embodiments, a cellular IOT modem 210 may be comprised of one or more amplifiers 310, down converters 320, frequency synthesizer 330, A/D converters (ADC) 340, receiver processor 360, and wakeup recovery circuitry 350. The cellular IOT modem 210 may also be electrically connected and/or coupled to an antenna 220 and a reference oscillator 230.

In various embodiments, a signal may be received by the antenna 220. The signal may be transmitted to an amplifier 310, which may amplify the signal received from the antenna 220. A reference oscillator 230 may provide a reference clock signal to a frequency synthesizer 330. The frequency synthesizer 330 may generate one or more frequencies. In various embodiments, the generated frequencies may be one or more multiples of the reference clock signal. The one or more frequencies may be provided to the down converter 320 to convert the signal received from the amplifier 310 down to a baseband signal. This baseband signal may be provided to an analog-to-digital converter (ADC) 340. The ADC 340 may convert the analog signal to a digital signal. The digital signal may be provided from the ADC 340 to the wakeup recovery circuitry 350 as well as the receiver processor 360.

The wakeup recovery circuitry 350 may perform one or more operations described herein for performing a wakeup recovery. The wakeup recovery circuitry 350 may perform these operations alone or along with receiver processor 360, MCU 250, and/or other components electrically connected or coupled to the wakeup recovery circuitry 350.

In various embodiments, the wakeup recovery 350 may be comprised of circuitry used for decoding signals transmitted or received via the antenna 220. For example, hardware architectures illustrated in FIGS. 10 and 11 may be comprised of electrical components and circuitry used by the IOT device 200 for other operations than wakeup recovery, such as operations associated with decoding and/or processing cellular signals from a cell 110. Such reuse of hardware lowers the cost and complexity of various embodiments described herein.

The wakeup recovery circuitry 350 may provide one or more signals and/or data to the receiver processor 360 as well as to other components outside of the IOT modem 210 (e.g., MCU 250), illustrated with reference no. 370. The receiver processor 360 may, among other things, utilize the signals and/or data from the wakeup recovery circuitry 350 to synchronize the IOT device 200 with a cell 110. The cell receiver processor 360 may also operate the IOT modem 210 to receive and transmit signals to a serving cell during operation of the IOT device 200.

The improved fast wakeup recovery operation described herein, in some examples, may be comprised of a two-step wakeup recovery process. The first step may be a coarse timing detection operation, and the second step may be a fine timing detection operation. During this two-step wakeup recovery process, and in synchronizing with a cell 110, the IOT modem 210 will use a primary synchronization signal and a secondary synchronization signal. In various embodiments of NBIOT systems, the primary synchronization signal is the narrowband primary synchronization signal (NPSS) and the secondary synchronization signal is the narrowband secondary synchronization signal (NSSS). The NPSS may be used for timing acquisition and initial frequency synchronization and the NSSS may be used for carrying cell information, such as a cell ID. Both the NPSS and the NSSS may be constructed from a frequency domain Zadoff-Chu sequence that has very good correlation properties. These correlation properties are used in matched filter operations described herein. The NPSS length may be 11 samples, and the NSSS may consist of 132 samples. The NPSS and NSSS may be found in subframe 5 and subframe 9 of a physical resource block (PRB) of a radio frame, which is further described herein.

In various embodiments of the present disclosure, the two-step wakeup recovery process may use the NPSS and NSSS, in some examples, to rapidly detect the timing and frequency error in the received signal and then to restore the synchronization between the UE 120 and the cell 110. In particular, the coarse timing detection operation may use, among other things, the NPSS and the fine timing tuning operation may use, among other things, the NSSS.

FIG. 4 illustrates an example radio frame structure 402 in accordance with one or more embodiments of the present disclosure. In various embodiments, and as illustrated in FIG. 4, radio frame structure 402 has a bandwidth 404 and a length of time 406. In various embodiments, the bandwidth 402 may be 3 MHz and the length 406 may be 10 ms. In various embodiments, FIG. 4 may illustrate a full spectrum of a legacy LTC cell (3 MHz) where a single PRB may be the NBIOT carrier. This may be one mode for an NBIOT deployment, which could be in-band (as illustrated), in a guard band (e.g., for a legacy LTE cell), or in a standalone mode (i.e., not attached to LTE altogether).

A radio frame structure 402 may include legacy control symbols 410 in a plurality of physical resources blocks (PRBs) 420. A PRB 420 may have a duration 406 (not illustrated), but FIG. 4 illustrates that a portion of each PRB 420 may include legacy control symbols 410. This portion of each PRB 420 that may include legacy control symbols may be a duration 434. The portion of each PRB that does not include legacy control symbols may be duration 436. It will be readily appreciated that while the legacy control symbols 410 and the plurality of PRBs 420 are illustrated separately, the legacy control symbols 410 are a part of the PRBs 420. In an embodiment illustrated in FIG. 4, the plurality of PRBs 420A-420O may be 15 PRBs 410A-410O. In various embodiments, each PRB 420 may have a bandwidth 430 of 180 kHz. While FIG. 4 illustrates the legacy control symbols 410 having a length 434 before each PRB, with a PRB having a length 436, this illustration is to illustrate that legacy control symbols are present for each PRB 420. As illustrated and described further herein, the legacy control symbols 410 may actually be the first one, two, or three OFDM symbols of each PRB 420.

In various embodiments, a NBIOT system may have a carrier of 200 kHz in a standalone mode. In other embodiments, there may be a carrier of 180 kHz in an in-band mode and/or a guard-band mode. Thus a NBIOT carrier may be deployed in an LTE carrier as a single PRB 420M of the plurality of PRBs 420 of the radio frame structure 402. While FIG. 4 illustrates this single PRB 420 as PRB 420M, in various embodiments another PRB 420 of the plurality of PRBs 420 may be chosen. This single PRB may be referred to as an anchor carrier.

FIG. 5 illustrates an exemplary frame structure in accordance with one or more embodiments of the present disclosure. The frame structure of FIG. 5 may be for a radio frame in the FDD mode. It will be appreciated that there may be different frame structures, such as for a TDD mode in a cellular system. A frame may be comprised of 10 subframes 510A-510J. A frame may have a length of 10 ms and each subframe 510 may have a length 520 of 1 ms. The subframes may be referred to as subframe 0-9. Thus, subframe 0 may be at 510A, subframe 1 may be at 510B, subframe 2 may be at 510C, subframe 3 may be at 510D, subframe 4 may be at 510E, subframe 5 may be at 510F, subframe 6 may be at 510G, subframe 7 may be at 510H, subframe 8 may be at 510I, and subframe 9 may be at 510J.

Each subframe 510 may be equally divided into two slots 530 of equal length of 0.5 ms. Each of the slots may be sequentially numbered from 0 to 19. Thus, subframe 0 at 510A may be comprised of slot 0 at 530A and slot 1 at 530B, subframe 1 at 510B may be comprised of slot 2 at 530C and slot 3 at 530D, subframe 2 at 510C may be comprised of slot 4 at 530E and slot 5 at 530F, subframe 3 at 510D may be comprised of slot 6 at 530G and slot 7 at 530H, subframe 4 at 510E may be comprised of slot 8 at 530I and slot 9 at 530J, subframe 5 at 510F may be comprised of slot 10 at 530K and slot 11 at 530L, subframe 6 at 510G may be comprised of slot 12 at 530M and slot 13 at 530N, subframe 7 at 510H may be comprised of slot 14 at 530O and slot 15 at 530P, subframe 8 at 510I may be comprised of slot 16 at 530Q and slot 17 at 530R, and subframe 9 at 510J may be comprised of slot 18 at 530S and slot 19 at 530T.

FIGS. 6A and 6B each illustrate a single subframe of an exemplary frame structure in accordance with one or more embodiments of the present disclosure, particularly embodiments associated with a single Tx antenna port. It will be appreciated that embodiments may go to additional and/or different frame structures, such as in embodiments with two antenna ports. A subframe 510 of an NBIOT system may be 14 OFDM symbols by 12 subcarriers. Thus the length 520F of 1 ms may be 14 OFDM symbols along axis l and the bandwidth 430 of 180 kHz may be 12 subcarriers along axis k. Each OFDM symbols and carrier together is a resource element (RE). The resource elements are index by their location along the l and k axes by $P_l(k)$. The RE in the lower left corner of a subframe 510 illustrated is $P_0(0)$, and the RE in the upper right corner of subframe 510 is $P_{13}(11)$.

In an NBIOT system, the NPSS may be encoded on subframe 5 at 510F and the NSSS may be encoded on subframe 9 at 510J of every other radio frame.

FIG. 6A illustrates an example of a single subframe of an exemplary frame structure in accordance with one or more embodiments of the present disclosure. In particular, FIG. 6A illustrates subframe 5 at 510F of an NBIOT, which includes the NPSS. Thus subframe 5 of an NBIOT PRB may be referred to as a NPSS subframe.

In various embodiments of NBIOT systems, subframe 5 at 51° F. may be the NPSSS subframe. The NPSS subframe may have a plurality of REs designated as LTE CRS REs 622. As illustrated, FIG. 6A includes LTE CRS REs at $P_0(5)$, $P_0(11)$, $P_5(2)$, $P_5(8)$, $P_8(5)$, $P_8(11)$, $P_{11}(2)$, and $P_{11}(8)$.

Aside from the LTE CRS REs 622, the NPSS subframe 510F may include the first three OFDM symbols of length 630 of each subcarrier being designated to legacy control symbols with legacy REs 624. The remainder of the subframe of length 640 may be used for the NPSS. The NPSS, however, may be of a length of 11 samples and, thus, subcarriers 622A-622K may be used for NPSS while subcarrier 622L may not be used or may be null or empty.

FIG. 6B illustrates another example of a single subframe of an exemplary frame structure in accordance with one or more embodiments of the present disclosure. In particular, FIG. 6B illustrates subframe 9 at 510J of an NBIOT of an even radio frame, which includes the NSSS. Thus subframe 9 of an NBIOT PRB may be referred to as a NSSS subframe.

In various embodiments of NBIOT systems, subframe 9 at 510J may be the NSSS subframe. The NSSS subframe may have a plurality of REs designated as LTE CRS REs 622. As illustrated, FIG. 6B includes LTE CRS REs at $P_0(5)$, $P_0(11)$, $P_5(2)$, $P_5(8)$, $P_8(5)$, $P_8(11)$, $P_{11}(2)$, and $P_{11}(8)$.

Aside from the LTE CRS REs 622, the NSSS subframe 510J may include the first three OFDM symbols of length 630 of each subcarrier being designated to legacy control symbols with legacy REs 624. The remainder of the subframe of length 650 may be used for the NSSS. The NSSS may be 132 samples, which is a length of 11 OFDMs by 12 subcarriers. Thus, subcarriers 622A-622L may be used for the NSSS.

A radio frame 402 may include a NPSS subframe and a NSSS subframe. From these NPSS subframe and NSSS subframe the respective synchronization signals of NPSS and NSSS may be decoded.

FIG. 7 illustrates an example block diagram of a flow chart of operations for fast wakeup recovery in accordance with one or more embodiments of the present disclosure. The fast wakeup recovery operation 710 described herein uses, first, a coarse timing detection operation 720 and a, second, fine timing detection operation 730. In each of the coarse timing detection operation 720 and the fine timing detection operation 730, correlation against multiple parallel hypothesis are used for fast detection. Additionally, bitwidth reduction is used for low complexity and a low operating frequency is used for power reduction.

Various embodiments of IOT devices 200 implementing the fast wakeup recovery operation 710 may also perform a plurality of operations that generate signals to be provided to the fast wakeup recovery operation 710. For example, an IOT device 200 may also include a X PPM operation 702, a mixer operation 704, an analog-to-digital converter (ADC) operation 706, that generate a signal to be provided to the fast wakeup recovery operation 710 from a signal received at the antenna 220.

The X part per million (PPM) operation 702 may utilize crystal or oscillator that may provide a mixer a carrier frequency for a mixer operation 704 and that may provide an ADC (e.g., ADC 340) a sampling clock for an ADC converter operation 706. The crystal or oscillator may, with the X PPM operation 702, provide the carrier frequency and the sampling clock with X part per million accuracy.

A mixer operation 704 may have inputs of a signal received from the antenna 220 and of pulses from an X PPM operation 702. The mixer operation 704 may mix the received signal according to the pulses to shift a signal from a first frequency range to another frequency range. The mixer operation 704 may provide the shifted signal to the ADC converter for an ADC operation 706.

An ADC operation 706 may receive the shifted signal from the mixer operation 704 and pulses from an X PPM operation 702. The ADC operation 706 may convert the shifted signal from an analog signal to a digital signal. The ADC operation 706 may also convert the pulses to a digital pulse signal.

The coarse timing detection operation 720 and the fine timing detection operation 730 are further described in FIG. 8 and FIG. 9, respectively.

FIG. 8 illustrates an example block diagram of a flow chart of operations for coarse timing detection operation 720 in accordance with one or more embodiments of the present disclosure. The coarse timing detection operation 720 may utilize the unique NPSS of subframe frame 5 at 510F to generate a coarse timing offset and frequency offset for N candidate cells. The coarse timing and frequency offset may be provided at 870 to the fine timing detection operation 730.

In some examples, the digital signal may be provided to the coarse timing operation 720. In various embodiments, the digital signal may be sampled at a sampling rate to generate a sampled signal 802. In various embodiments, the sampled signal 802 may be sampled at rate of 1.92 MHz to generate 1.92 MSamples/sec. The sample signal 802 may be provided to a downsampler 810.

The downsampler 810 may utilize a down sampling ratio to downsample a sampled signal 802 to generate a downsampled signal. Such a downsampled signal may reduce the complexity of the hardware required to perform one or more operations of the coarse timing detection. In various embodiments, a down sampling ratio of 8 is selected to simplify the design complexity while maintaining a high detection probability. Applying a downsampling ratio of 8 results in a downsampled signal of 240 kSamples/sec down from 1.92 MSamples/sec.

The downsampled signal may be provided to matched filters and averaging operations 820. The matched filters and averaging operations 820 may include a plurality of parallel tracks of NPSS matched filters (MF) operations 830, approximate absolute (ABS) value operations 840 for complexity reduction, and time averaging and dynamic scaling operations (AVG & DS) 850 before performing a maximizing operation 860. In the embodiments illustrated in FIG. 8 illustrates three parallel tracks A, B, and N of NPSS MF operation 830, ABS operations 840, and AVG & DS operations 850. Specifically, the first track may be comprised of NPSS MF operation 830A, ABS operation 840A, and AVG & DS operation 850A; the second track may be comprised of NPSS MF operation 830B, ABS operation 840B, and AVG & DS operation 850B; and the third track may be comprised of NPSS MF operation 830N, ABS operation 840N, and AVG & DS operation 850N. It will readily be appreciated that N may be greater than a three.

NPSS MF operations 830 may be designed with each matched filter representing a decimated version of the NPSS sequence after applying a frequency offset. A matched filter may correlate a known or reference signal (e.g., a NPSS sequence) with an unknown signal (e.g., received signal) to detect the presence of the known signal in the unknown signal. For example, each NPSS may be quantized in 4 bits. Each NPSS MF operation 830A, 830B, . . . , 830N represents a different decimated NPSS with a unique frequency offset. Thus, each NPSS MF operation 830 acts to test a frequency hypothesis, and the use of multiple NPSS MF operations 830 allow for testing a plurality of frequency hypotheses. The difference between each frequency hypotheses may be a set value. Alternatively, it may be a variable value.

In various embodiments, the frequency offset between each of the frequency hypotheses may be chosen based on NSSS correlation properties that impact the fine timing detection operation 730. For example, the number of frequency hypotheses to test may be determined according to the required frequency resolution for the fine timing detection operation 730. For example, NSSS detection may be immune to the frequency offset within certain range A. If the frequency offset is higher than Δ, the detection accuracy for the NSSS may be reduced. Thus, the NPSS frequency hypotheses may be able to provide a frequency resolution less than or equal to A. This A may be quantified to be +/−375 Hz, and the resolution of the NPSS may be defined to be 750 Hz. In some embodiments, there may be 13 parallel tracks to test 13 different frequency hypotheses, and the frequency offset resolution for these 13 different frequency hypotheses may be 750 Hz.

The clock frequency utilized for performing the coarse timing detection operation 720 may utilize a clock or reference oscillator 230 of the IOT device 200. For example, a reference oscillator generating a 26 MHz clock frequency may be used. Such a reference oscillator 230 does not require a temperature-controlled oscillator. Additionally, resource scheduling across time may be employed to reduce the number of number of MAC operations within the allowed NPSS processing time, which may be 10 ms due to its allocation within the radio frame.

In various embodiments, the NPSS MF operation 830 may be comprised of a multiply-accumulate (MAC) operation to correlate a frequency hypothesis with the downsampled sampled signal. As a further example of resource sharing, multiply-accumulate (MAC) circuitry may be shared. In various embodiments, the number of MAC operations required may be 5,740,800 (which is 13 hypothesis*184 locations in shift register storing the sampled signal*2400 samples per one radio frame (e.g., 10 ms) with a sampling rate of 240 kHz). These MAC operations may be executed during 10 msecs or 260,000 clock cycles. To reduce the control logic complexity and since multiplier area is small (for 4 bits), 26 MAC units may be employed.

The downsampled signal is passed through the decimated NPSS MF operation 830 and after this operation an ABS operation 840 is performed. The ABS operations 840 may convert a signal into an absolute value of the signal. In various embodiments, the ABS operation 840 may utilize two adders and a bit-shifter to perform the ABS operation 840.

For each parallel track, the output of an ABS operation 840 may be provided to a time averaging and dynamic scaling (AVG & DS) operation 850. Time averaging may be used to denoise the correlation results. This may be particularly effective in low SNR scenarios where additional noise may be present.

The AVG & DS operations 850 include time averaging and then the results of the time averaging may be dynamically scaled. The time averaging provides for de-noising, which may provide for robust performance in low SNR scenarios where noise may be relatively high. The time averaging may utilize an averaging depth input 852, which in various embodiments may be referred to as L.

Dynamic scaling, in some examples, may be used to keep the number of bits used in the decision metric at a minimum. The dynamic scaling may utilize the dynamic range and reduce the bit-width of the decision metric. A reduced bit-width may reduce the required memory size for the AVG & DS operations 850.

After the AVG & DS operations 850, the coarse timing and the frequency offset may be estimated jointly by a maximizing (MAX) operation 860. A decision metric of a maximum is evaluated as a function of the timing index and frequency offset. When a maximum is found then the coarse timing and the frequency offset associated with the maximum will be chosen. In various embodiments, the maximization operation 860 may be performed after processing each track of the coarse timing detection operation 720.

In various embodiments, a tolerance may be added before performing the maximization operation 860. This tolerance in the timing may be associated with the decimation process and may be a number of samples. In various embodiments, the tolerance may be as high as 8 to 12 samples. In some embodiments, the timing accuracy may be a function of the channel conditions in addition to the downsampling process. For example, for very deep coverage scenarios where SNR is very low, there may be an imperfect timing.

In various embodiments, the NPSS carries no signature for the identified serving cell 110 and the maximization operation 860 may be used to report multiple candidate cells. Thus N multiple cells 110 may show up as N candidate cells 110 during this wakeup recovery procedure. Thus a filtration mechanism may be utilized. These N multiple candidate cells may be filtered by the NSSS correlation of the fine timing detection operation 730.

The maximization operation 860 may be applied while observing N candidate cells. In various embodiments, the number N of candidate cells may be programmable. For example, the number of candidate cells may be programmable to be in the range of 1 to 8 candidate cells. For each candidate cell, duplicates in the correlation of NPSS MF operations 830 across parallel tracks may be nulled to provide a chance for more cells to show up.

Side peaks may be present for each candidate cell, especially when a candidate cell has a relatively high cell power. The presence of these side peaks may be due to the correlation properties of the original NPSS sequence not being perfect. The maximization operation 860 may also null out the side peaks in order to reduce the complexity of the signals, to not lead to confusion following candidate selection, and to allow the detection of weaker candidates.

In various embodiments, on-the-fly maximization may be performed to reduce complexity. For example, on-the-fly maximization may determination a maximum as additional signals from a parallel track are evaluated with the maximization operation 860. In this manner, a current maximum may be compared against the next signal but not with past signals.

In evaluating the processing time of coarse timing detection operation 720, the processing time may be evaluated as a function of the required performance and the cell SINR range prior to the sleep.

The coarse timing detection operation 720 is performed in the time domain. The outcomes of the coarse timing detection operation 720, in some examples, are a coarse timing offset and a frequency offset for N candidate cells that may be provided at 870 to the fine timing detection operation 730. The frequency offset for each of the N candidate cells may be one of the frequency hypotheses.

FIG. 9 illustrates an example block diagram of a flow chart of operations for fine timing detection operation 730 in accordance with one or more embodiments of the present disclosure. The fine timing detection operation 730 receives input from the coarse timing detection operation 720. In particular, inputs include a coarse timing offset and a frequency offset for N candidate cells. These inputs along with prior knowledge of the serving cell parameters from before the IOT device entered a sleep mode, the fine timing detection operation 730 may filter out fake candidates and identify a true candidate to connect to. The outcomes of the fine timing detection operation 730 may be a fine sample timing, a radio frame timing, and the winning candidate cell.

The fine timing detection operation 730 include a plurality of operations illustrated in FIG. 9. The fine timing detection operation 730 may include a time alignment operation 910, a CFO correction operation 912, a CP removal operation 914, a FFT operation 918, and matched filters and averaging operations 920. The matched filters and averaging operations 920 may include a phase compensation operation 930 that feeds into a plurality of parallel tracks. Each parallel track may include a MF operation 940, an approximate absolute operation 950, and an averaging and dynamic scaling operation 960. Each of the parallel tracks may then feed into a maximization operation 970. The maximization operation 970 may determine a phase shift and a cell frame timing of the wining candidate.

For each of the N candidate cells identified in the coarse timing detection operation 720, the time alignment operation 910 and carrier frequency offset (CFO) correction operation 920 are applied for the sampled signal 802. The timing alignment operation 910 may apply a coarse timing offset, obtained from the coarse timing operation at 870, for the candidate cell. The CFO correction operation 920 may apply a frequency offset, obtained from the coarse timing operation at 870, for the candidate cell.

Thus the coarse time alignment operation 910 and carrier frequency offset (CFO) correction 920 are applied multiple times—once for each of the candidate cells.

The time alignment operation 910 and CFO correction operation 912 provide, for each time applied, an output to a CP removal operation 914. The CP removal operation 914 may remove the cyclic prefix (CP) for each OFDM in a given subframe. With these inputs from the coarse timing detection operation 720, the subframe timing is acquired and the NSSS subframe can be synthesized to the frequency domain through the CP removal operation 914 and FFT operation 918.

In various embodiments, the CP removal operation 914 may remove the cyclic prefix (CP) from the NSSS.

In various embodiments, the FFT operation 918 may be provided the output of the CP removal operation 914 of a NSSS without a CP and perform a fast-Fourier transform on this output to convert it from the time domain to the frequency domain. Thus the NSSS may be synthesized.

Once in the frequency domain, the synthesized NSSS may be tested with fine sample shift hypotheses. These fine sample shift hypotheses are implemented via phase compensation operations 930. In various embodiments, a linear phase ramp may be introduced for each OFDM symbol according to a sample shift ($\beta$) 932 being tested. For example, this may include 7 different sample shifts being considered for testing the sample timing hypotheses.

The sample timing hypothesis may be used to refine the estimated timing and overcome any residual timing error from the coarse timing detection operation 720.

The sample timing hypothesis of the fine timing detection operation 730 may act as a second-dimension hypotheses in addition to the general radio frame hypotheses that would be carried out through NSSS. In various embodiments, the sample timing hypotheses may be applied via a progressive phase shift to the frequency-domain subcarriers prior to the NSSS cross-correlation process. In various embodiments, the number of sample timing hypothesis to test may be associated with an amount by which radio frame timing may still be correctly decoded. For example, and for the sample timing hypotheses for fine timing, an embodiment may include 7 different sample shifts (e.g., −12, −8, −4, 0, 4, 8, and 12). Such different sample shifts may cover ambiguity in the coarse timing operation 720. Additionally, and while FIG. 9 is illustrated with parallel tracks, a single track may be used to iteratively try all of the sample timing hypotheses for fine timing. In some embodiments, the four parallel tracks of FIG. 9 may illustrate four different radio frame hypotheses.

The timing hypotheses are tested with a MF operation 940. The MF operation 940 may include using a general frequency-domain NSSS matched filter. The NSSS may be generated according to the serving cell ID 944. In various embodiments, the serving cell ID 944 may be the cell ID of a serving cell 110 used by a IOT device 200 before the IOT device 200 entered a sleep mode. However, cell timing may be unknown if the sleep period (i.e., period of time for which the IOT device 200 was asleep) is large.

Similar to MF operations 830 with the coarse timing operations 730, the MF operations 940 may use a fixed-point optimization. In various embodiments, the fixed-point optimization may include the MF NSSS sequence quantized to 8 bits. This may minimize the precision necessary for the correlation and also optimize the decision metric precision for the fine timing operation 730. In various embodiments, the reference signal is quantized in 8 bits, which may increase performance.

In various embodiments, the NSSS sequence from various OFDM symbols may be correlated by matched filters with the NSSS sequences generated for various radio frame indices (nf) 942. In various embodiments, the radio frame number of the various radio frame indices 942 may be estimated by applying the possible 4 sample timing hypotheses of the NSSS sequence. Each sample timing hypothesis may be a fine timing sample.

In various embodiments, the number of MAC operations used for correlating these hypotheses is 29,568 (which is 7 sample shifts*4 radio frame hypothesis*132 subcarriers*8 cell candidates) for a period of 10 msec or 260,000 clock cycles. In such embodiments, a single MAC hardware unit may be utilized.

An approximated absolute (ABS) operation 950 may be performed on the output of each NSSS MF operation 940. The ABS operations 950 may convert a signal into an absolute value of the signal. In various embodiments, the approximated absolute operation 950 may be performed by the same hardware that performed the ABS operation 840. In various embodiments, the ABS operation 950 may utilize two adders and a bit-shifter, which may be the same two adders and one bit-shifter used for ABS operation 840. Such sharing of hardware may reduce the complexity of the IOT device 200.

For each parallel track, the output of the ABS operation 950 may be provided to an averaging and dynamic scaling (AVG & DS) operation 960. Averaging may be employed to denoise the correlation results. The denoising may be used to compact low SNR scenarios. Operations in the fine timing detection operation 730 are performed in the frequency domain and not the time domain. In various embodiments, the averaging may be over multiple (M) NSSS windows, where each NSSS window may represent time domain samples that include one instance of NSSS signal. This may be particularly effective in low SNR scenarios where additional noise may be present. In various embodiments, the averaging and dynamic scaling operation 960 may be performed by the same hardware that performed the averaging and dynamic scaling operation 850. Such sharing of hardware may reduce the complexity of the IOT device 200.

After correlation over some and/or all the different hypothesis by the matched filters from each of the parallel tracks, a decision metric may be evaluated to determine a winning candidate as well as the winning candidate's fine sample timing offset and radio frame timing. In various embodiments, the decision metric may be a function of the candidate cell, the fine sample timing, and the radio frame timing. The winning cell candidate, the fine sample timing, and the radio frame timing are selected jointly by maximizing the decision metric over these dimensions.

In various embodiments, the maximization operation 970 may be performed as on-the-fly maximization, which may reduce complexity in some examples. For example, on-the-fly maximization may determination a maximum as additional signals from a parallel track are evaluated with the maximization operation 970. In this manner, a current maximum may be compared against the next signal but not with past signals.

FIGS. 10 and 11 illustrate exemplary hardware of various embodiments of the present disclosure. These various embodiments may include, in some examples, the hardware for implementing the wakeup recovery process described herein may share components for not only cost effectiveness but also to lower power consumption by reducing the hardware required to execute wakeup recovery operations. Additionally, or alternatively, the IOT devices of various embodiments of the present disclosure may utilize regular oscillators already in the IOT devices instead of temperature-controlled oscillators.

FIG. 10 illustrates an example hardware architecture for coarse timing detection in accordance with one or more embodiments of the present disclosure. Thus various embodiments may perform the coarse timing detection operation 720 with the hardware architecture illustrated in FIG. 10. It will be appreciated that the hardware and/or circuitry illustrated may be one example for hardware and/or circuitry that may perform an associated operation.

The NPSS reference signal generator 1002 is used to generate an NPSS sequence.

Hypothesis angle selector circuitry 1004 may be used to generate a plurality of hypothesis angles. Each of the hypothesis angles may be associated with a frequency offset of a frequency hypothesis to add to a downsampled signal.

Angle rotator circuitry 1006 may be used to rotate the angle of a signal. The angle rotator circuitry 1006 may generate and apply a frequency offset. The angle rotator circuitry 1006 may receive a plurality of hypothesis angles from the hypothesis angle selector circuitry 1004. The angle rotator circuitry 1006, having received a plurality of hypothesis angles, may generate frequency offsets for each of the plurality of hypothesis angles.

The generated NPSS sequence from the NPSS reference signal generator 1002 is provided to the angle rotator circuitry 1006 to apply the plurality of frequency offsets associated with the plurality of hypothesis angles. Each time a frequency offset is applied, a different track of the parallel tracks in the coarse timing detection operation 720 is provided the signal. Additionally, in various embodiments, the first track (e.g., with 830A) may be provided the generated NPSS sequence with a frequency offset and each subsequent track would be provided with a frequency offset.

Shift register 1008 may store a decimated received signal from an antenna 220. In various embodiments, the shift register 1008 may be a 184 location shift register.

The MAC circuitry 1010 may be comprised of a multiplier array 1012 and an accumulator 1014. The MAC circuitry 1010 may also be referred to as a correlator. For example, in various embodiments, the input signal from the angle rotator circuitry 1006 may be correlated with a plurality of different NPSS sampled signals.

The multiplier array circuitry 1012 may utilize one or more complex multiplier circuits. In various embodiments, 26 complex multiplier circuits may be run at clock speed of 26 MHz for correlating 13 different frequency hypotheses for an NPSS sampled signal.

The output of the correlator 1010 may be provided to ABS circuitry 1020. The ABS circuitry 1020 may generate an absolute value output signal that is the absolute value of an input signal, such as the output of the correlator 1010.

The output from the ABS circuitry 1020 may be provided to the averaging circuitry 1022. The averaging circuitry 1022 may average an input signal across a plurality of windows. In various embodiments, a window in the time domain may be a period of time, such a waveform length or averaging depth L. In various embodiments, a window in the frequency domain may be a range of frequencies. The output of the averaging circuitry may be stored in a memory bank 1024.

During wakeup recovery there may be no UE 120 activities required. The memory bank 1024 may store accumulated decision metric from when the UE 120 was last connected to a service cell 110. The memory bank 1024 may thus be used store accumulated decision metric data that may be reused from the data decoded processing memories from when the UE 120 previously sent/received data to a service cell 110.

Maximization circuitry 1026 may receive the signals from the averaging circuitry 1022 and perform maximization operations 860.

The output of the maximization circuitry 1026 may be provided to early termination circuitry 1028. The early termination circuitry 1028 may terminate the wakeup recovery operation 710 early. For example, an early termination may save time if the maximization circuitry 1026 has not finished maximizations for all candidate cells but has determined a relative maximum compared with maximums for data stored in memory bank 1024. Such a relative maximum may be associated with an improvement in an environment 100 that may allow, for example, for an improved SNR. While the improved environment of the relative maximum may not be an absolute maximum of all cell candidates, the early termination of the wakeup recovery operation 710 may decrease power consumption used by the IOT device once the IOT device has determined an acceptable relative maximum. In various embodiments, the relative maximum may be compared to a threshold of prior maximums associated with last known SINR, and if this threshold is exceed by the relative maximum an early termination may occur.

FIG. 11 illustrates an example hardware architecture for fine timing detection in accordance with one or more embodiments of the present disclosure. Thus various embodiments may perform the fine timing detection operation 730 with the hardware architecture illustrated in FIG. 11. It will be appreciated that the hardware and/or circuitry illustrated may be one example for hardware and/or circuitry that may perform an associated operation.

In various embodiments, the timing alignment operation 910, the CFO correction operation 912, the CP removal operation 914, and FFT operation 918 may use hardware shared from the data decoding chains of the IOT modem 210. Thus, no dedicated hardware may be introduced for the wakeup recovery operation 710. By sharing hardware with these other portions of the IOT modem 210, the cost and complexity of the IOT device 200 is reduced.

The memory write handler 1102 may utilize the start offset for each candidate cell to fetch a NSSS sequence from a received signal at the antenna 220 and store it is dedicated memory bank 1104. In various embodiments, memory bank 1104 may be the same memory as memory bank 1024.

After a NSSS sequence is fetched by the memory write handler 1102, the memory read handler 1106 may read the NSSS sequence from the memory 1104 and transfer it to the frequency domain using FFT circuitry 1108.

The FFT circuitry 1108 may provide a fast-Fourier transform that converts and input in the time domain into an output in the frequency domain. In various embodiments, the FFT operation 918 may utilize a 128-point FFT circuitry 1108. In various embodiments, the FFT circuitry 1108 may be shared with the data decoding chains of the IOT modem 210. The FFT circuitry 1108 may store the converted signal in the sample memory bank 1110. In various embodiments, the sample memory bank 1110 may be the same memory as memory bank 1104 or memory bank 1024.

The ZC sequence generator circuitry 1112 may be used to generate a NSSS sequence. The generated NSSS sequence is stored in the memory 1104. In the frequency domain, the received SSS sequence is cross-correlated with the pre-generated original SSS sequence by the correlator 1010. In various embodiments, 28 correlation hypothesis covering all possible frame numbers and sample offset may be performed over a NSSS sequence and the correlation may be performed using single complex multiplier array running at 26 MHz clock speed and an accumulator 1014. The output of the averaging circuitry may be stored in a memory bank 1024.

In various embodiments, the output of the correlator 1010 may be provided to an ABS circuitry 1020. In various embodiments, and as illustrated in FIG. 11, the ABS circuitry may be omitted.

Then the output of the correlator may be provided to averaging circuitry 1022. The averaging circuitry 1022 may average an input signal across a plurality of windows. In the frequency domain, a window may be a range of frequencies. Maximization circuitry 1026 may receive the signals from the averaging circuitry 1022 and perform maximization operations 860.

The output of the maximization circuitry 1026 may be provided to early termination circuitry 1028. The early termination circuitry 1028 may be the same early termination circuitry 1026 described in regard to FIG. 10 and may perform an early termination in the manner described herein.

FIG. 12 illustrates an example block diagram of a flow chart of operations for determining when to perform wakeup recovery operations in accordance with one or more embodiments of the present disclosure.

At operation 1210, an active time for an IOT device is determined. In various embodiments, the active time may be determined based on when a paging message is expected to be received. The determination of the active time may, for example, determine a specific time (e.g., tens or hundreds of milliseconds). Alternatively, or additional, the determination of the active time may generate an amount of time until the IOT device is to be active to receive a paging message.

At operation 1220, a processing time for wakeup recovery is estimated based on a last known SINR. The last known SINR may be associated with the last time the IOT device 200 was connected to a cell. The SINR from that connection may be stored in memory (e.g., memory bank 1024). In various embodiments, that SINR may be a value in dB, such as −5 dB. Based on this last known SINR, the IOT modem 210 may estimate a processing time for wakeup recovery. Processing times may be based on prior operations and/or may be calibrated during the manufacturing of an IOT modem 210 or an IOT device 200.

At operation 1230, a time until wakeup recovery may be determined. The time until active having been determined at operation 1210 may be used in conjunction with the estimated processing time for wakeup recovery estimated at operation 1220 to determine at what time the IOT device 200 may need to begin performing wakeup recovery operations in order to be awake and active to receive a paging message. This may be determined by subtracting the estimated processing time from the determination of active time. In various embodiments, an additional time period may be added to allow for errors and increase tolerances.

At operation 1240, wakeup recovery operations are performed. The wakeup recovery operations will be performed once time until wakeup recovery has passed. This passing of time triggers the IOT modem 210 to perform wakeup recovery operations as described herein.

FIGS. 13-16 illustrate estimations of performance of embodiments of the present disclosure under different channel environments and/or scenarios, such as with different probability detections, SNR, and/or processing times.

FIG. 13 illustrates an exemplary graph 1300 of coarse timing detection performance in accordance with one or more embodiments of the present disclosure. This graph 1300 illustrates coarse timing detection performance in processing time in ms for a probability detection of 98% as a function of SNR in dB.

The graph 1300 of FIG. 13 illustrates that for various embodiments the processing time decreases as SNR increases. In particular, graph 1300 illustrates a processing time of 160 ms at a SNR of −15 dB and that the processing time drops to 20 ms once SNR is at or above −7 dB. Starting from SNR of −1 dB, a single radio frame containing one instance of NPSS is sufficient to detect the coarse timing with 98% detection probability.

FIG. 14 illustrates an exemplary graph 1400 of coarse timing detection performance in accordance with one or more embodiments of the present disclosure. This graph 1400 illustrates coarse timing detection performance in probability detection percentage as a function of processing time in ms for various SNR in dB.

The graph 1400 of FIG. 14, the various SNR in dB may be for different embodiments with multiple IOT devices 200 that each experience different channel conditions or for an embodiment of an IOT device 200 that experiences varying channel conditions. Graph 1400 illustrates 8 SNR scenarios: −15 dB; −11 dB; −7 dB; −5 dB; −1 dB; 1 dB; 7 dB; and 9 dB.

For each of the SNR scenarios of −1 dB, 1 dB, 7 dB, and 9 dB, the graph 1400 illustrates a detection probability percentage over 99% for processing times of less than 10 ms, which is a single NPSS instance.

For a scenario of −5 dB, graph 1400 illustrates a detection probability percentage of 98% or greater for processing times 20 ms and greater.

For a scenario of −7 dB, graph 1400 illustrates a detection probability percentage of 98% or greater for processing times 20 ms and greater and that the detection probability drops below 90% for processing times below 20 ms.

For a scenario of −11 dB, graph 1400 illustrates a detection probability percentage of 98% or greater for processing times 50 ms and greater and that the detection probability drops below 90% for processing times below approximately 30 ms.

For a scenario of −15 dB, graph 1400 illustrates a detection probability percentage of 98% or greater for processing times 160 ms and greater and that the detection probability drops below 90% for processing times below 110 ms.

FIG. 15 illustrates an exemplary graph 1500 of fine timing detection performance in accordance with one or more embodiments of the present disclosure. This graph 1500 illustrates fine timing detection performance in processing time in ms for a probability detection of 98% as a function of SNR in dB.

The graph 1500 of FIG. 15 illustrates that for various embodiments the processing time decreases as SNR increases. In particular, graph 1500 illustrates a processing time of 220 ms at a SNR of −14 dB and that the processing time drops to 20 ms once SNR is at or above −6 dB. The minimum time for NSSS detection may be 20 ms as NSSS is physically allocated every 20 ms.

FIG. 16 illustrates an exemplary graph 1600 of fine timing detection performance in accordance with one or more embodiments of the present disclosure. This graph 1600 illustrates fine timing detection performance in probability detection percentage as a function of processing time in ms for various SNR in dB.

The graph 1600 of FIG. 16, the various SNR in dB may be for different embodiments with multiple IOT devices 200 that each experience different channel conditions or for an embodiment of an IOT device 200 that experiences varying channel conditions. Graph 1600 illustrates 9 SNR scenarios: −14 dB; −12 dB; −8 dB; −6 dB; −2 dB; 0 dB; 2 dB; 6 dB; and 8 dB.

For each of the SNR scenarios of −6 dB, −2 dB, 0 dB, 2 dB, 6 dB, and 8 dB, the graph 1600 illustrates a detection probability percentage over 98% for processing times of 20 ms.

For a scenario of −8 dB, graph 1600 illustrates a detection probability percentage of 98% or greater for processing times 40 ms and greater and that the detection probability drops below 94% for processing times at 20 ms.

For a scenario of −12 dB, graph 1600 illustrates a detection probability percentage of 98% or greater for processing times 100 ms and greater and that the detection probability drops below 90% for processing times below approximately 60 ms.

For a scenario of −14 dB, graph 1600 illustrates a detection probability percentage of 98% or greater for processing times 220 ms and greater and that the detection probability drops below 90% for processing times below 120 ms.

Operations and/or functions of the present disclosure have been described herein, such as in flowcharts. As will be appreciated, computer program instructions may be loaded onto a computer or other programmable apparatus (e.g., hardware) to produce a machine, such that the resulting computer or other programmable apparatus implements the operations and/or functions described in the flowchart blocks herein. These computer program instructions may also be stored in a computer-readable memory that may direct a computer, processor, or other programmable apparatus to operate and/or function in a particular manner, such that the instructions stored in the computer-readable memory produce an article of manufacture, the execution of which implements the operations and/or functions described in the flowchart blocks. The computer program instructions may also be loaded onto a computer, processor, or other programmable apparatus to cause a series of operations to be performed on the computer, processor, or other programmable apparatus to produce a computer-implemented process such that the instructions executed on the computer, processor, or other programmable apparatus provide operations for implementing the functions and/or operations specified in the flowchart blocks. The flowchart blocks support combinations of means for performing the specified operations and/or functions and combinations of operations and/or functions for performing the specified operations and/or functions. It will be understood that one or more blocks of the flowcharts, and combinations of blocks in the flowcharts, can be implemented by special purpose hardware-based computer systems which perform the specified operations and/or functions, or combinations of special purpose hardware with computer instructions.

While this specification contains many specific embodiments and implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

While operations and/or functions are illustrated in the drawings in a particular order, this should not be understood as requiring that such operations and/or functions be performed in the particular order shown or in sequential order, or that all illustrated operations be performed, to achieve desirable results. In certain circumstances, operations and/or functions in alternative ordering may be advantageous. In some cases, the actions recited in the claims may be performed in a different order and still achieve desirable results. Thus, while particular embodiments of the subject matter have been described, other embodiments are within the scope of the following claims.

While this specification contains many specific embodiment and implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are illustrated in the drawings in a particular order, this should not be understood as requiring that such operations be performed in the particular order shown or in sequential order, or that all illustrated operations be performed, to achieve desirable results. In certain circumstances, operations in alternative ordering may be advantageous. In some cases, the actions recited in the claims may be performed in a different order and still achieve desirable results.

Thus, while particular embodiments of the subject matter have been described, other embodiments are within the scope of the following claims.

While this detailed description has set forth some embodiments of the present disclosure, the appended claims may cover other embodiments of the present disclosure which differ from the described embodiments according to various modifications and improvements.

Within the appended claims, unless the specific term "means for" or "step for" is used within a given claim, it is not intended that the claim be interpreted under 35 U.S.C. § 112, paragraph (f).

The invention claimed is:

1. A method comprising:
 executing a wakeup recovery operation, wherein the wakeup recovery operation comprises:
  executing, by an NBIOT modem of a NBIOT device, a coarse timing detection operation, wherein the coarse timing detection operation generates a coarse timing offset and a coarse frequency offset based on a sampled signal by:
   generating, via a downsampler, a downsampled signal based on the sampled signal;
   determining a plurality of frequency offsets;
   generating a plurality of offset downsampled signals based on the plurality of frequency offsets and the downsampled signal, wherein each of the plurality of offset downsampled signals has a different frequency offset;
   correlating the offset downsampled signals with a plurality of NPSS matched filters, wherein each of the NPSS matched filters is based on an NPSS sequence and one of the plurality of offset downsampled signals;
   approximating an absolute value of each of the plurality of correlated offset downsampled signals;
   averaging each of the plurality of approximated absolute values of each of the correlated offset downsampled signals;
   dynamically scaling each of the plurality of averaged approximated absolute values of each of the correlated offset downsampled signals;
   determining a coarse timing maximum of the plurality of dynamically scaled averaged approximated absolute values of each of the correlated offset downsampled signals;
   determining the coarse timing offset and the coarse frequency offset based on the coarse timing maximum;
  executing, by the NBIOT modem, a fine timing detection operation, wherein a fine timing sample operation generates a cell identifier based on the sampled signal, the coarse timing offset, and the coarse frequency offset; and
 entering, by the NBIOT device, an active mode wherein the NBIOT modem is synchronized with a cell associated with the cell identifier.

2. The method of claim 1, wherein executing the fine timing detection operation comprises:
 generating a NSSS sequence in a frequency domain based on the sampled signal, wherein synthesizing the NSSS sequence in the frequency domain comprises:
  determining a NSSS sequence from the sampled signal;
  applying a time alignment to the NSSS sequence based on the coarse timing offset;
  correcting a carrier frequency offset of the NSSS sequence based on the coarse frequency offset;
  removing a cyclical prefix of the NSSS sequence;

applying a fast-Fourier transform to the NSSS sequence;
determining a plurality of fine timing samples;
correlating the NSSS sequence in the frequency domain with a plurality of NSSS matched filters, wherein each of the NSSS matched filters is based on one of the plurality of fine timing samples and a cell ID of a first cell;
approximating an absolute value of each of the plurality of correlated NSSS sequences in the frequency domain;
averaging each of the plurality of approximated absolute values of each of the correlated NSSS sequences in the frequency domain;
dynamically scaling each of the plurality of averaged approximated absolute values of each of the correlated NSSS sequences in the frequency domain;
determining a fine timing maximum of the plurality of dynamically scaled averaged approximated absolute values of each of the correlated NSSS sequences in the frequency domain; and
determining the cell identifier based on the fine timing maximum.

3. The method of claim 2, wherein determining the coarse timing maximum further comprises nulling one or more side peaks of one or more of the plurality of dynamically scaled averaged approximated absolute values of each of the correlated offset downsampled signals; and
wherein determining the fine timing maximum further comprises nulling one or more side peaks of one or more of the plurality of dynamically scaled averaged approximated absolute values of each of the correlated NSSS sequences in the frequency domain.

4. The method of claim 2, wherein determining the coarse timing maximum is based on-the-fly maximization, and wherein determining the fine timing maximum is based on on-the-fly maximization.

5. The method of claim 2, wherein the NPSS sequence is decimated and the NSSS sequence is decimated.

6. The method of claim 1, wherein generating, via a downsampler, a downsampled signal based on the sampled signal is based on downsampling by a ratio of 8.

7. The method of claim 1, further comprising:
receiving, at an antenna of the NBIOT device and prior to executing the wakeup recovery operation, a first cellular signal from a first cell;
entering, by the NBIOT device, a sleep mode;
receiving, at the NBIOT modem, a second cellular signal from one or more cells, wherein the one or more cells include the first cell; and
sampling the second cellular signal to generate the sampled signal.

8. The method of claim 7, further comprising:
determining, after entering the sleep mode and prior to executing the wakeup recovery operation, an active time;
estimating a processing time for the wakeup recovery operation;
determining a time until the wakeup recovery operation; and
wherein executing the wakeup recovery operation is executed after the time until wakeup recovery operation has passed.

9. The method of claim 8, further comprising:
determining, prior to entering sleep mode, a SINR based on the first cellular signal; and
wherein estimating a processing time for the wakeup recovery operation is based on the SINR based on the first cellular signal.

10. A NBIOT device comprising:
an NBIOT modem, wherein the NBIOT modem is configured to:
execute a wakeup recovery operation, wherein the wakeup recovery operation comprises:
execute a coarse timing detection operation, wherein the coarse timing detection operation generates a coarse timing offset and a coarse frequency offset based on a sampled signal by:
generate, via a downsampler, a downsampled signal based on the sampled signal;
determine a plurality of frequency offsets;
generate a plurality of offset downsampled signals based on the plurality of frequency offsets and the downsampled signal, wherein each of the plurality of offset downsampled signals has a different frequency offset;
correlate the offset downsampled signals with a plurality of NPSS matched filters, wherein each of the NPSS matched filters is based on an NPSS sequence and one of the plurality of offset downsampled signals;
approximate an absolute value of each of the plurality of correlated offset downsampled signals;
average each of the plurality of approximated absolute values of each of the correlated offset downsampled signals;
dynamically scale each of the plurality of averaged approximated absolute values of each of the correlated offset downsampled signals;
determine a coarse timing maximum of the plurality of dynamically scaled averaged approximated absolute values of each of the correlated offset downsampled signals; and
determine the coarse timing offset and the coarse frequency offset based on the coarse timing maximum;
execute a fine timing detection operation, wherein a fine timing sample operation generates a cell identifier based on the sampled signal, the coarse timing offset, and the coarse frequency offset; and
enter an active mode wherein the NBIOT modem is synchronized with a cell associated with the cell identifier.

11. The NBIOT device of claim 10, wherein to execute the fine timing detection operation the NBIOT modem is further being configured to:
generate a NSSS sequence in a frequency domain based on the sampled signal, wherein synthesizing the NSSS sequence in the frequency domain comprises:
determine a NSSS sequence from the sampled signal;
apply a time alignment to the NSSS sequence based on the coarse timing offset;
correct a carrier frequency offset of the NSSS sequence based on the coarse frequency offset;
remove a cyclical prefix of the NSSS sequence;
apply a fast-Fourier transform to the NSSS sequence;
determine a plurality of fine timing samples;
correlate the NSSS sequence in the frequency domain with a plurality of NSSS matched filters, wherein each of the NSSS matched filters is based on one of the plurality of fine timing samples and a cell ID of a first cell;

approximate an absolute value of each of the plurality of correlated NSSS sequences in the frequency domain;

average each of the plurality of approximated absolute values of each of the correlated NSSS sequences in the frequency domain;

dynamically scale each of the plurality of averaged approximated absolute values of each of the correlated NSSS sequences in the frequency domain;

determine a fine timing maximum of the plurality of dynamically scaled averaged approximated absolute values of each of the correlated NSSS sequences in the frequency domain; and determine the cell identifier based on the fine timing maximum.

12. The NBIOT device of claim 11, wherein to determine the coarse timing maximum further comprises nulling one or more side peaks of one or more of the plurality of dynamically scaled averaged approximated absolute values of each of the correlated offset downsampled signals; and wherein to determine the fine timing maximum further comprises nulling one or more side peaks of one or more of the plurality of dynamically scaled averaged approximated absolute values of each of the correlated NSSS sequences in the frequency domain.

13. The NBIOT device of claim 11, wherein to determine the coarse timing maximum is based on on-the-fly maximization, and wherein to determine the fine timing maximum is based on on-the-fly maximization.

14. The NBIOT device of claim 10, wherein to generate, via the downsampler, a downsampled signal based on the sampled signal is based on downsampling by a ratio of 8.

15. The NBIOT device of claim 10, wherein the NBIOT device further comprises an antenna; and wherein the NBIOT modem is further configured to:

receive, from the antenna and prior to executing the wakeup recovery operation, a first cellular signal from a first cell received by the antenna;

enter a sleep mode;

receive a second cellular signal from one or more cells, wherein the one or more cells include the first cell; and sample the second cellular signal to generate the sampled signal.

16. The NBIOT device of claim 15, wherein the NBIOT modem is further configured to:

determine, after entering sleep mode and prior to executing the wakeup recovery operation, an active time;

estimate a processing time for the wakeup recovery operation;

determine a time until the wakeup recovery operation; and wherein to execute the wakeup recovery operation is executed after the time until wakeup recovery operation has passed.

17. The NBIOT device of claim 16, wherein the NBIOT modem is further configured to:

determine, prior to entering sleep mode, a SINR based on the first cellular signal; and wherein to estimate the processing time for the wakeup recovery operation is based on the SINR based on the first cellular signal.

18. A modem comprising at least one processor and at least one memory coupled to the processor, wherein the processor is configured to:

execute a wakeup recovery operation, wherein the wakeup recovery operation comprises:

execute a coarse timing detection operation, wherein the coarse timing detection operation generates a coarse timing offset and a coarse frequency offset based on a sampled signal by:

generate, via a downsampler, a downsampled signal based on the sampled signal;

determine a plurality of frequency offsets;

generate a plurality of offset downsampled signals based on the plurality of frequency offsets and the downsampled signal, wherein each of the plurality of offset downsampled signals has a different frequency offset;

correlate the offset downsampled signals with a plurality of NPSS matched filters, wherein each of the NPSS matched filters is based on an NPSS sequence and one of the plurality of offset downsampled signals;

approximate an absolute value of each of the plurality of correlated offset downsampled signals;

average each of the plurality of approximated absolute values of each of the correlated offset downsampled signals;

dynamically scale each of the plurality of averaged approximated absolute values of each of the correlated offset downsampled signals;

determine a coarse timing maximum of the plurality of dynamically scaled averaged approximated absolute values of each of the correlated offset downsampled signals; and determine the coarse timing offset and the coarse frequency offset based on the coarse timing maximum;

execute a fine timing detection operation, wherein a fine timing sample operation generates a cell identifier based on the sampled signal, the coarse timing offset, and the coarse frequency offset; and enter an active mode wherein the modem is synchronized with a cell associated with the cell identifier.

* * * * *